(12) United States Patent
Abe et al.

(10) Patent No.: US 7,222,911 B2
(45) Date of Patent: May 29, 2007

(54) VEHICLE BODY FRAME STRUCTURE

(75) Inventors: Yoshio Abe, Shioya-gun (JP); Yasuhiro Morisaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 190 days.

(21) Appl. No.: 11/135,098

(22) Filed: May 23, 2005

(65) Prior Publication Data

US 2005/0264042 A1    Dec. 1, 2005

(30) Foreign Application Priority Data

Jun. 1, 2004    (JP)    ............................. 2004-163033

(51) Int. Cl.
*B62D 25/20*    (2006.01)
(52) U.S. Cl. .............................. 296/187.11; 296/203.02
(58) Field of Classification Search ........... 296/187.11, 296/187.12, 203.02, 203.03
See application file for complete search history.

(56) References Cited

U.S. PATENT DOCUMENTS 6,234,568 B1 * 5/2001 Aoki ..................... 296/203.04
6,830,287 B1 * 12/2004 Aghssa et al. ......... 296/187.11
2003/0071490 A1 * 4/2003 Nishikawa et al. ..... 296/203.04
2004/0195865 A1 * 10/2004 Tomita ................... 296/203.04

FOREIGN PATENT DOCUMENTS

JP    62-60309    5/1982
JP    62-60309    12/1987

* cited by examiner

*Primary Examiner*—Joseph D. Pape
(74) *Attorney, Agent, or Firm*—Rankin, Hill, Porter & Clark LLP

(57) ABSTRACT

A vehicle body frame structure includes a side sill and a rear frame continuously joined, with a curved portion formed in the vicinity of a boundary between the side sill and the rear frame. In the curved portion, a continuous change is achieved extending from the side sill side to the rear frame side from a side sill side closed cross-sectional structure portion where a first stiffener is provided to a rear frame side closed cross-sectional structure portion where a second stiffener is provided having a different direction of alignment from that of the first stiffener. An improvement is obtained in the strength of a curved portion in the vicinity of a boundary between a side sill and a rear frame when these are joined together so as to be continuous with each other.

2 Claims, 21 Drawing Sheets

VEHICLE BODY FRAME STRUCTURE

BACKGROUND OF THE INVENTION

1. Field of the Invention

Priority is claimed on Japanese Patent Application No. 2004-163033, filed Jun. 1, 2004, the contents of which are incorporated herein by reference.

The present invention relates to a vehicle body frame structure and, in particular, to an improvement in the rigidity thereof.

2. Description of Related Art

Technology has been developed for a vehicle frame structure that achieves an improvement in rigidity as a result of joining a side sill to a rear frame such that they form a continuous member by joining a front end portion of the rear frame to an inner side of a rear end portion of the side sill (see, for example, Japanese Patent Application Examined Publication No. 62-60309. If a side sill and rear frame are joined together so as to be continuous in this manner, the space utilization efficiency is also improved. Consequently, this type of structure has the merit of allowing the space for installing a fuel tank and the like to be enlarged.

In a structure in which a side sill and rear frame are joined together continuously in this manner, a curved portion is provided in the vicinity of a boundary between the side sill that is positioned at a bottom portion of the vehicle body side portion and the rear frame that is positioned to the rear of the side sill so as to avoid the rear tire. The strength of this curved portion is slightly reduced.

Accordingly, it is an object of the present invention to provide a vehicle body frame structure that enables an improvement to be obtained in the strength of a curved portion in the vicinity of a boundary between a side sill and a rear frame when these are joined together continuously.

SUMMARY OF THE INVENTION

In order to achieve the above described object, according to the present invention, there is provided a vehicle body frame structure comprising a side sill (for example, the side sill 11 of the present embodiment) and a rear frame (for example, the rear frame 12 of the present embodiment) joined together so as to be continuous with each other, with a curved portion (for example, the curved portion 15 of the present embodiment) formed in the vicinity of a boundary between the side sill and the rear frame; and a side sill side closed cross-sectional structure portion (for example, the side sill side closed cross-sectional structure portion 150 of the present embodiment) with a first stiffener (for example, the rear frame side stiffener 95 of the present embodiment) arranged therein, and a rear frame side closed cross-sectional structure portion (for example, the rear frame side closed cross-sectional structure portion 154 of the present embodiment) with a second stiffener (for example, the rear frame front stiffener 99 and rear frame stiffener 100 of the present embodiment) arranged therein that has a different direction of alignment from that of the first stiffener, the side sill side closed cross-sectional structure portion and the rear frame side closed cross-sectional structure portion being provided in the curved portion such that a continuous change is achieved extending from the side sill side to the rear frame side from the side sill side closed cross-sectional structure portion to the rear frame side close cross-sectional structure portion.

With the structure as mentioned above, because the curved portion, which is in the vicinity of the boundary between the side sill and the rear frame that are joined so as to be continuous, continuously changes extending from the side sill side to the rear frame side from the side sill side closed cross-sectional structure portion where the first stiffener is provided to the rear frame side closed cross-sectional structure portion where the second stiffener is provided in a different alignment direction from that of the first stiffener, the strength of the curved portion is improved. Moreover, because the alignment direction of the first stiffener is different from that of the second stiffener, the respective directions of reinforcement can each be optimized on both the side sill side and the rear frame side.

Preferably, in the vehicle body frame structure as described above, the strength of the side sill is greater in a left-right direction than in an up-down direction, and the strength of the rear frame is greater in an up-down direction than in a left-right direction, and the first stiffener is arranged between a top surface and a bottom surface of the side sill side closed cross-sectional structure portion, and the second stiffener is arranged between a left surface and a right surface of the rear frame side closed cross-sectional structure portion.

With the structure as mentioned above, because the first stiffener is placed between the top and bottom surfaces of the side sill side closed cross-sectional structure portion, which has less strength against force in the up-down direction than in the left-right direction, while the second stiffener is placed between left and right surfaces of the rear frame closed cross-sectional structure portion that has less strength against force in the left-right direction than in the up-down direction, the respective directions of reinforcement can each be optimized on both the side sill side and the rear frame side.

BRIEF DESCRIPTION THE DRAWINGS

DETAILED DESCRIPTION OF THE INVENTION

The vehicle body frame structure of an embodiment of the present invention will now be described with reference made to the drawings. Note that the front and rear referred to in the description below are the front and rear in the longitudinal direction of a vehicle body.

Figure 1:
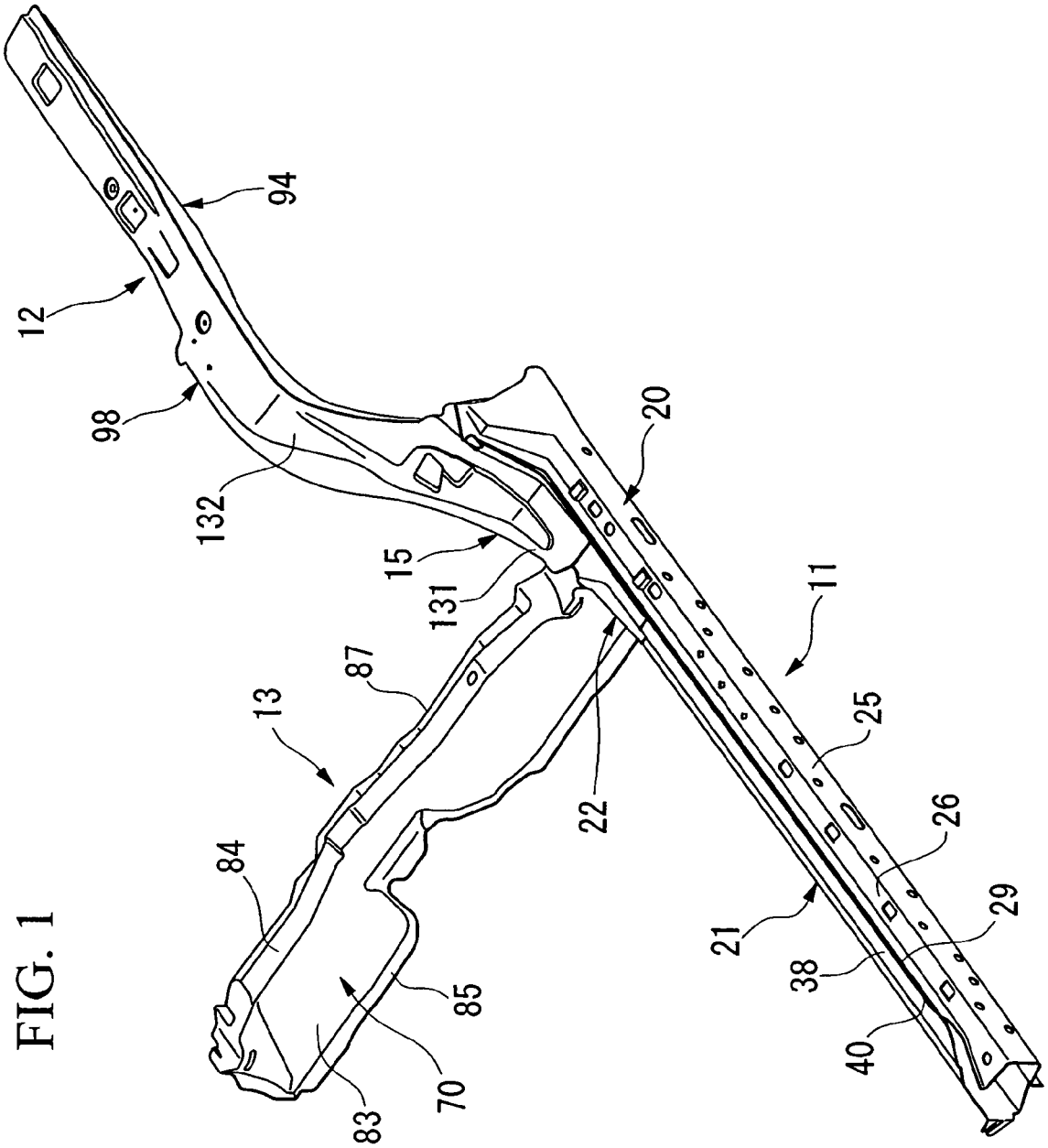
FIG. 1 is a perspective view as seen obliquely from the front showing an entire vehicle body frame structure of an embodiment of the present invention.
Figure 2:
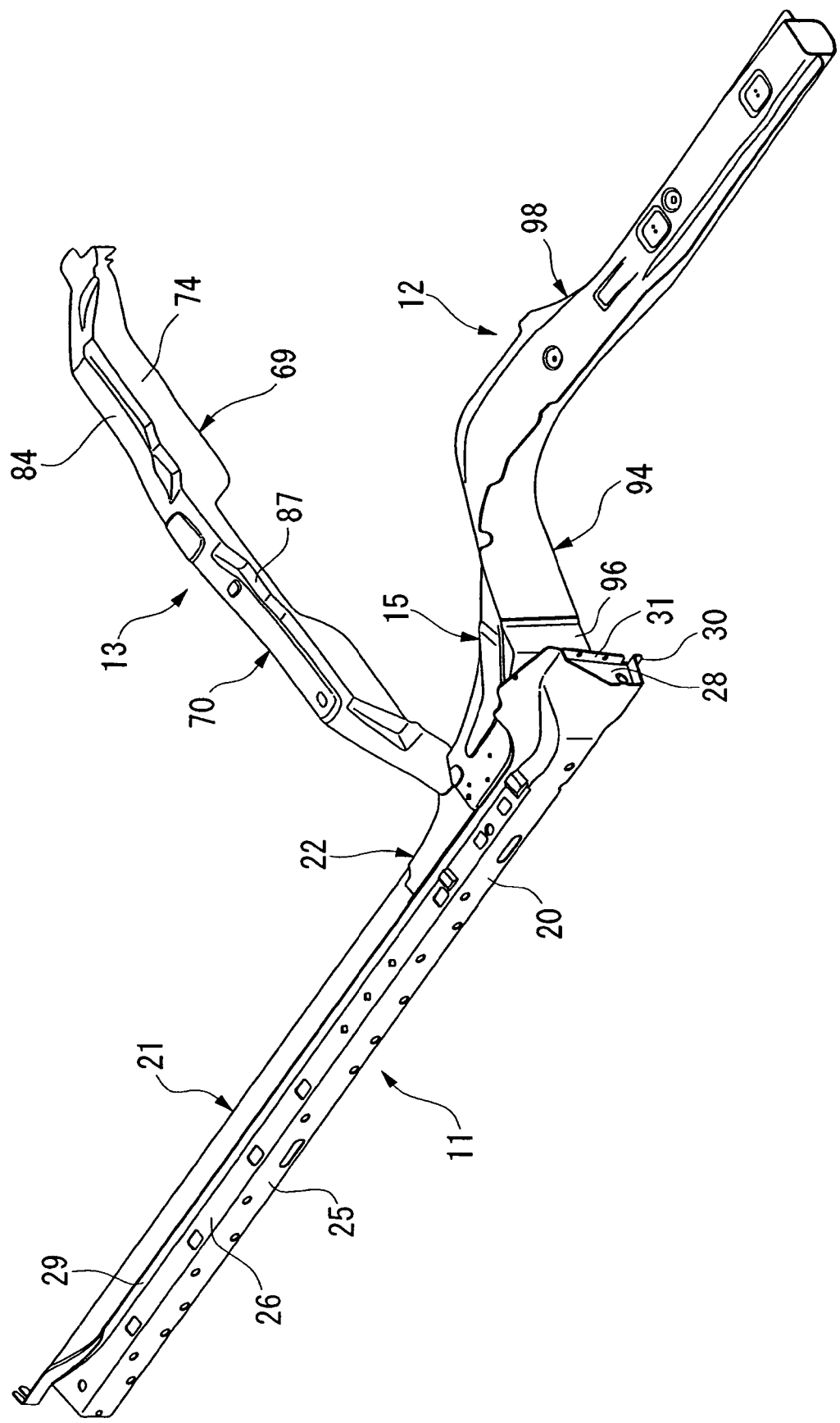
FIG. 2 is a perspective view as seen obliquely from the rear showing the entire vehicle body frame structure of an embodiment of the present invention.

As is shown in FIGS. 1 and 2, in the vehicle body frame structure of this embodiment, a rear frame 12 that slopes upward towards the rear and then extends in the longitudinal direction is continuously joined to a rear end portion of a side sill 11 that extends in the longitudinal direction at a bottom portion of a vehicle body side portion. An end portion of a mid-floor cross member 13 that extends in the vehicle transverse direction is joined in front of the position of the join between the rear frame 12 and side sill 11.

The side sill 11, the rear frame 12, and the mid-floor cross member 13 constitute body frame members, and a cross-section of each taken in a direction orthogonal to the direction in which they extend shows a closed cross-sectional structure. In particular, the closed cross-sectional structures of the side sill 11 and the rear frame 12 are joined to each other. Note that a curved portion 15 is formed in the vicinity of the boundary between the side sill 11 and the rear frame 12 as a result of the rear frame 12 being sloped in the manner described above.

A side sill reinforcement 20 that, as is shown in FIGS. 3 to 6, extends in the longitudinal direction and has a hat-shaped cross section that is open on an inner side in the vehicle transverse direction, a front side sill inner 21 that extends in the longitudinal direction and has a hat-shaped cross section that is open on an outer side in the vehicle transverse direction, and that is joined to an inner side in the vehicle transverse direction of the side sill reinforcement 20, and a side sill joint 22 that, as is shown in FIGS. 3, 4, 7, and 8, extends in the longitudinal direction and has a hat-shaped cross section that is open on an outer side in the vehicle transverse direction, and that is joined to an inner side in the vehicle transverse direction of the side sill reinforcement 20 at the rear of the front side sill inner 21 are provided in a bottom portion of the vehicle body side portion. An outer panel 23 (see FIGS. 4 and 6) that has a hat-shaped cross section that is open on the inner side in the vehicle transverse direction is further joined at this cross-sectional portion to an outer side in the vehicle transverse direction of the side sill reinforcement 20.

Figure 3:
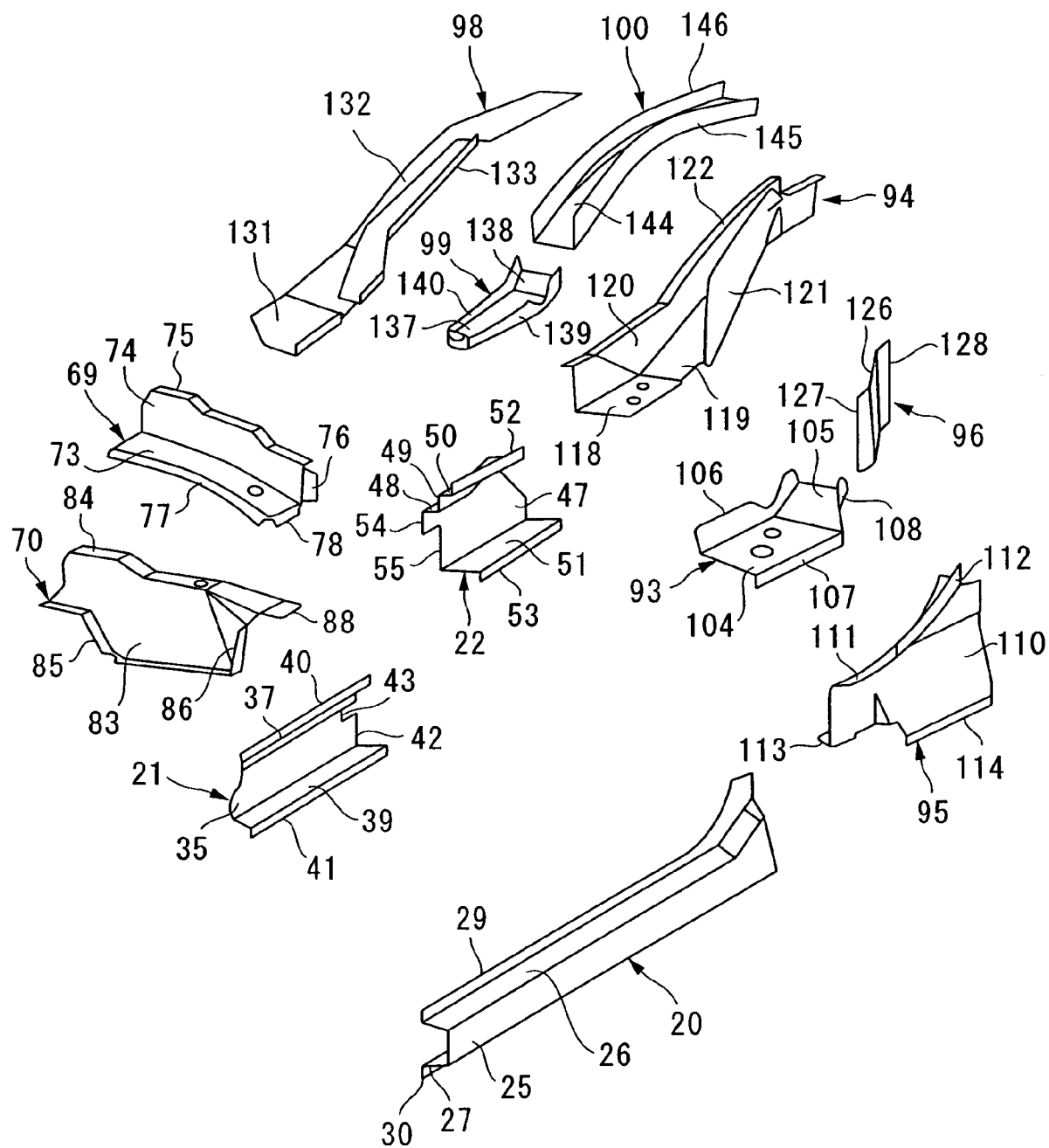
FIG. 3 is an exploded perspective view showing respective structural components of the vehicle body frame structure of an embodiment of the present invention.

As is shown in FIG. 3, the side sill reinforcement 20 has a side plate portion 25 that extends in the longitudinal direction while having an attitude that extends in a substantially vertical direction, and whose rear end portion is configured so as to widen in an upward direction towards the rear, a top plate portion 26 that is bent from a top edge portion of the side plate portion 25 inwards in the vehicle transverse direction, a bottom plate portion 27 that is bent from a bottom edge portion of the side plate portion 25 inwards in the vehicle transverse direction, a rear plate portion 28 (see FIG. 2) that protrudes from the rear end side of the side plate portion 25 inwards in the vehicle transverse direction, a flange portion 29 that is bent upwards from an edge portion on the inner side in the vehicle transverse direction of the top plate portion 26, a flange portion 30 that is bent downwards from an edge portion on the inner side in the vehicle transverse direction of the bottom plate portion 27, and a flange portion 31 that is bent towards the rear from an edge portion on the inner side in the vehicle transverse direction of the rear plate portion 28.

Figure 5:
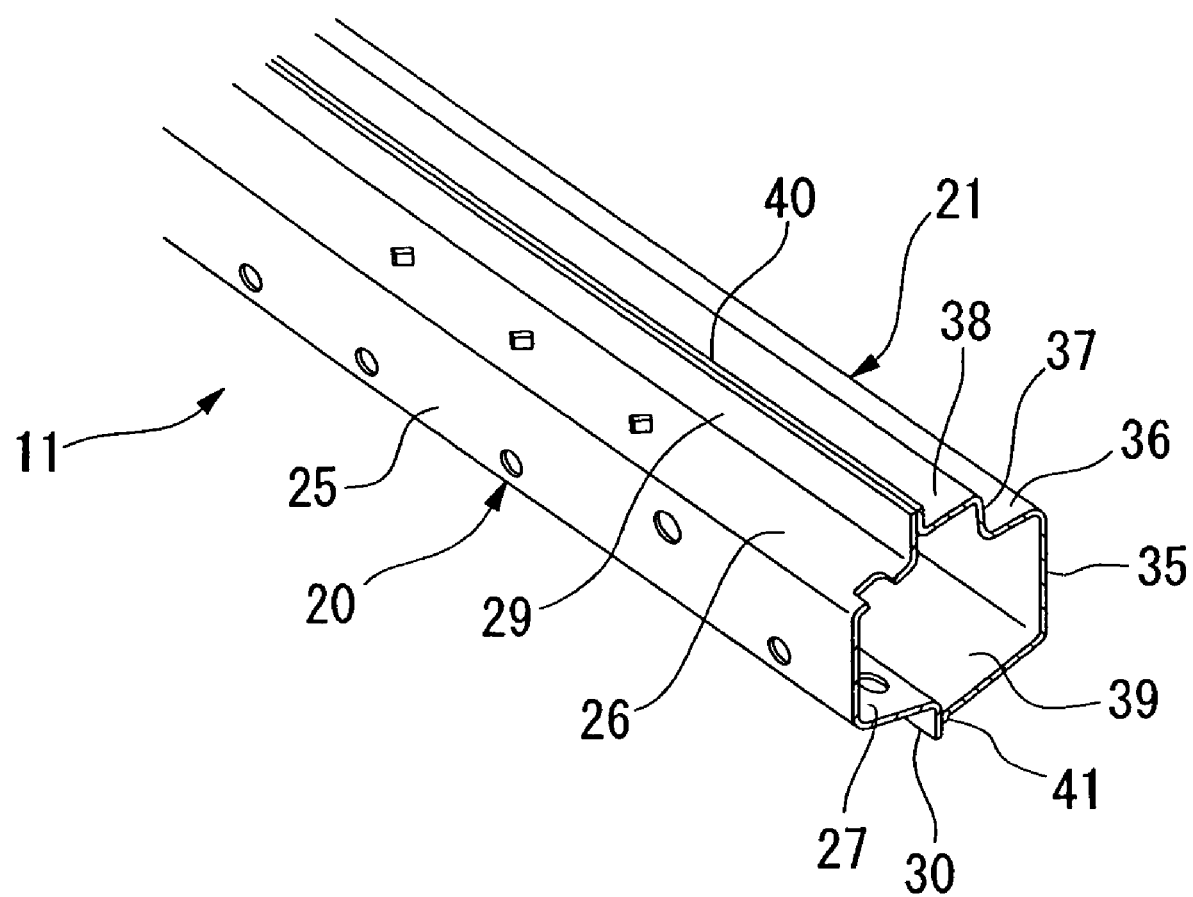
FIG. 5 is a perspective view showing a side sill of the vehicle body frame structure of an embodiment of the present invention cut in a cross-section at a right angle relative to the longitudinal direction of the vehicle body.

As is shown in FIG. 5, the front side sill inner 21 has a side plate portion 35 that is configured so as to extend in the longitudinal direction while having an attitude that extends in a substantially vertical direction, an intermediate plate portion 36 that is bent outwards in the vehicle transverse direction from a top edge portion of the side plate portion 35, an intermediate plate portion 37 that is bent upward from an edge portion on the outer side in the vehicle transverse direction of the intermediate plate portion 36, a top plate portion 38 that is bent outwards in the vehicle transverse direction from a top edge portion of the intermediate plate portion 37, a bottom plate portion 39 that is bent outwards in the vehicle transverse direction from a bottom edge portion of the side plate portion 35, a flange portion 40 that is bent upwards from an edge portion on the outer side in the vehicle transverse direction of the top plate portion 38, and a flange portion 41 that is bent downwards from an edge portion on the outer side in the vehicle transverse direction of the bottom plate portion 39. Here, as is shown in FIG. 3, rear end portions that continue on from the bottom portion of the side plate portion 35, the bottom plate portion 39, and the lower side flange portion 41 of the front side sill inner 21 form a protruding portion 42 that protrudes towards the rear beyond the upper side portion. As a result, rear end portions that continue on from the top portion of the side plate portion 35, the intermediate plate portion 36, the intermediate plate portion 37, the top plate portion 38, and the upper flange portion 40 of the front side sill inner 21 form a notch portion 43 that is cut out so as to be positioned on the forward side of the bottom side portion.

The side sill joint 22 has a side plate portion 47 that is configured so as to extend in the longitudinal direction while having an attitude that extends in a substantially vertical direction and whose rear end portion is configured so as to widen in an upward direction towards the rear, an intermediate plate portion 48 that is bent outwards in the vehicle transverse direction from a top edge portion of the side plate portion 47, an intermediate plate portion 49 that is bent upward from an edge portion on the outer side in the vehicle transverse direction of the intermediate plate portion 48, a top plate portion 50 that is bent outwards in the vehicle transverse direction from a top edge portion of the intermediate plate portion 49, a bottom plate portion 51 that is bent outwards in the vehicle transverse direction from a bottom edge portion of the side plate portion 47, a flange portion 52 that is bent upwards from an edge portion on the outer side in the vehicle transverse direction of the top plate portion 50, and a flange portion 53 that is bent downwards from an edge portion on the outer side in the vehicle transverse direction of the bottom plate portion 51. Here, front end portions that continue on from the top portion of the side plate portion 47, the intermediate plate portion 48, the intermediate plate portion 49, the top plate portion 50, and the upper side flange portion 52 of the side sill joint 22 form a protruding portion 54 that protrudes towards the front beyond the lower side portion. As a result, front end portions that continue on from the bottom portion of the side plate portion 47, the bottom plate portion 51, and the lower flange portion 53 of the side sill joint 22 form a notch portion 55 that is cut out so as to be positioned on the rearward side of the top side portion.

Figure 4:
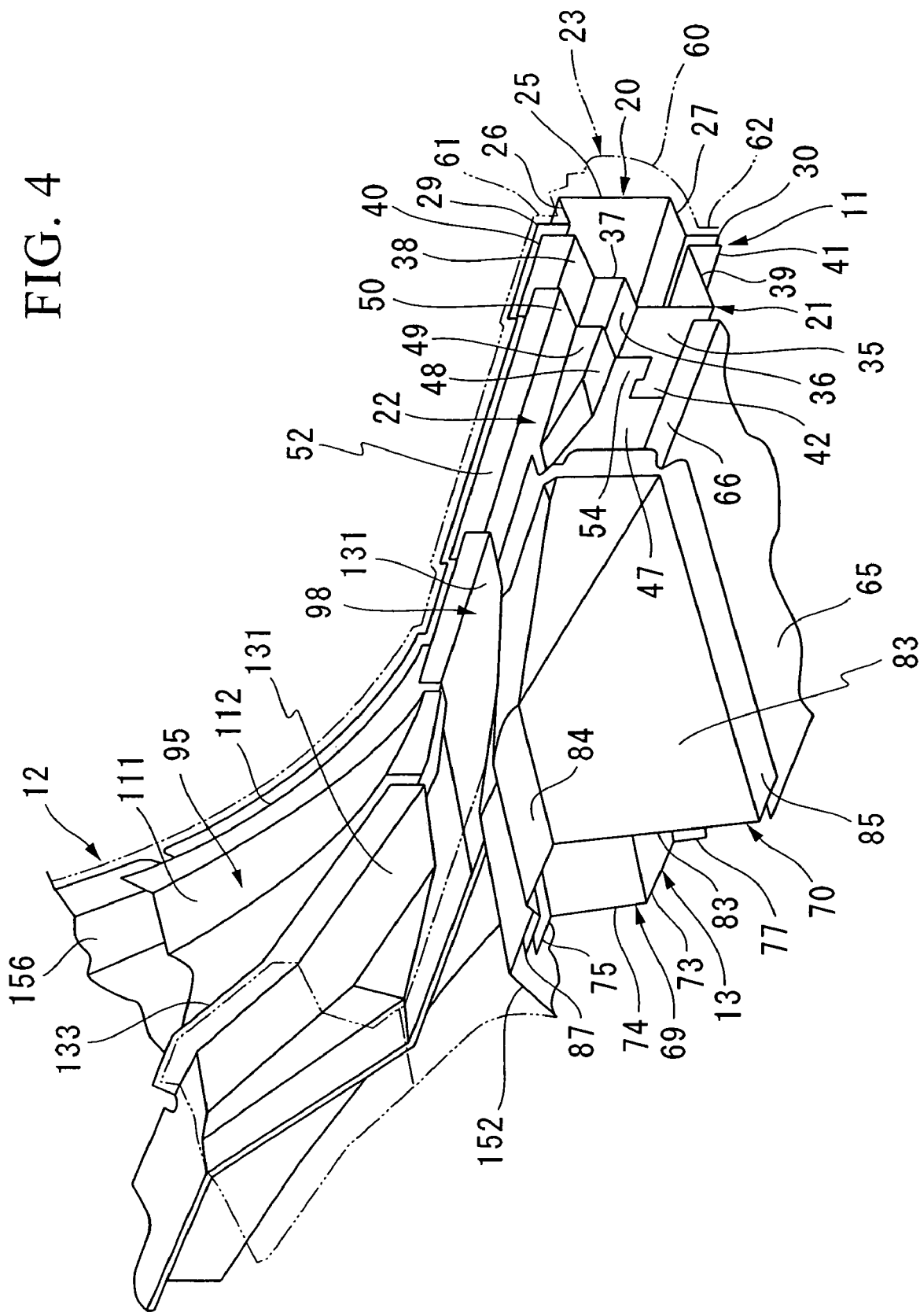
FIG. 4 is a perspective view of the vicinity of a curved portion of the vehicle body frame structure of an embodiment of the present invention.

As is shown in FIG. 4, the outer panel 23 also has a bulging plate portion 60 that is shaped so as to bulge outwards in the vehicle transverse direction, a flange portion 61 that is bent upwards from a top edge portion of the bulging plate portion 60, and a flange portion 62 that is bent downwards from a bottom edge portion of the bulging plate portion 60.

Figure 7:
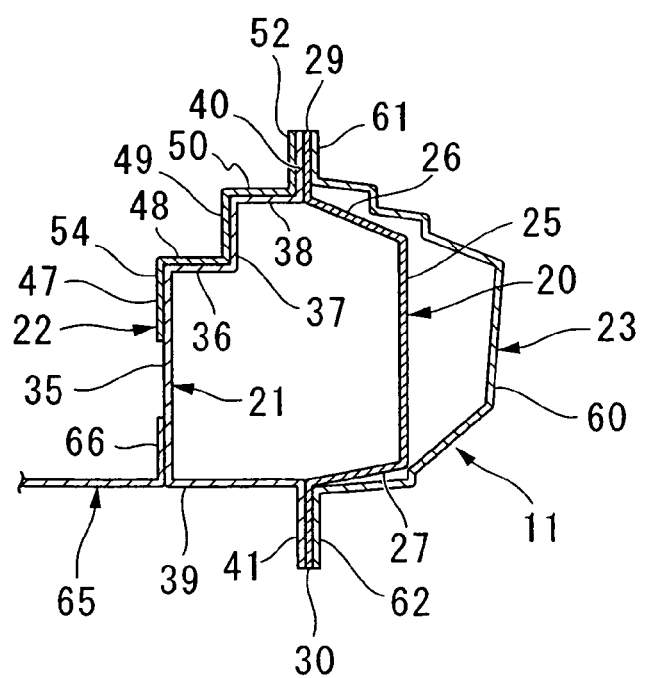
FIG. 7 is a front cross-sectional view from a position further to the rear side than in FIG. 6 of the vehicle body frame structure of an embodiment of the present invention.

When the side sill joint 22 is joined to a rear portion of the front side sill inner 21, as is shown in FIG. 7, the protruding portion 54 at the top of the side sill joint 22 is joined by being superposed over the entire inner side in the vehicle transverse direction of the front side sill inner 21. Namely, the side sill joint 22 respectively enables the side plate portion 47 to be joined to the inner side in the vehicle transverse direction of the side plate portion 35 of the front side sill inner 21, the intermediate plate portion 48 to be joined to the top side of the intermediate plate portion 36, the intermediate plate portion 49 to be joined to the inner side in the vehicle transverse direction of the intermediate plate portion 37, the top plate portion 50 to be joined to the top side of the top plate portion 38, and the flange portion 52 to be joined to the inner side in the vehicle transverse direction of the flange portion 40.

Figure 8:
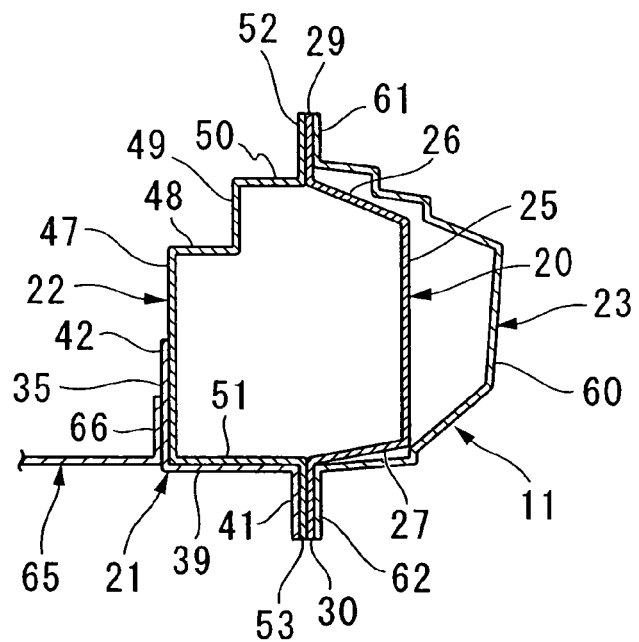
FIG. 8 is a front cross-sectional view from a position further to the rear side than in FIG. 7 of the vehicle body frame structure of an embodiment of the present invention.

When the side sill joint 22 is joined to the rear portion of the front side sill inner 21, as is shown in FIG. 8, the protruding portion 42 of the bottom portion of the front side sill inner 21 is joined by being superposed onto the entire outer side in the vehicle transverse direction of the side sill joint 22. Namely, the front side sill inner 21 respectively enables the side plate portion 35 to be joined to the inner side in the vehicle transverse direction of the side plate portion 47 of the side sill joint 22, the bottom plate portion 39 to be joined to the bottom side of the bottom plate portion 51, and the flange portion 41 to be joined to the inner side in the vehicle transverse direction of the flange portion 53.

In this manner, the side sill reinforcement 20 is joined to the outer side in the vehicle transverse direction of the front side sill inner 21 and side sill joint 22 that are joined integrally, and the outer panel 23 is further joined to the outer side in the vehicle transverse direction thereof. At this time, on the front side, as is shown in FIG. 6, in the upper portion, the flange portions 40, 29, and 61 that are on the upper side of the front side sill inner 21, the side sill reinforcement 20, and the outer panel 23 are superposed and joined, while in the lower portion, the flange portions 41, 30, and 62 that are on the lower side of the front side sill inner 21, the side sill reinforcement 20, and the outer panel 23 are superposed and joined.

Figure 6:
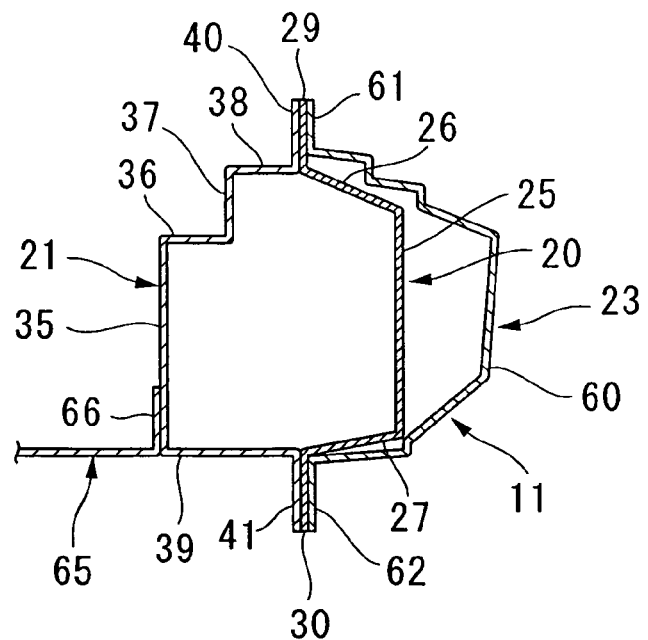
FIG. 6 is a front cross-sectional view of the vehicle body frame structure of an embodiment of the present invention.

Furthermore, as is shown in FIG. 7, in a particular portion of the protruding portion 54 of the side sill joint 22, which is on the rear side of the position shown in FIG. 6, in the upper portion, the flange portions 52, 40, 29, and 61 that are on the upper side of the side sill joint 22, the front side sill inner 21, the side sill reinforcement 20, and the outer panel 23 are superposed and joined, while in the lower portion, the flange portions 41, 30, and 62 that are on the lower side (the side sill joint 22 is not included) are superposed and joined.

Furthermore, as is shown in FIG. 8, in a particular portion of the protruding portion 42 of the front side sill inner 21, which is on the rear side of the position shown in FIG. 7, in the upper portion, the flange portions 52, 29, and 61 of the side sill joint 22, the side sill reinforcement 20, and the outer panel 23 are superposed and joined, while in the lower portion, the flange portions 41, 53, 30, and 62 (with the front side sill inner 21 included therein) are superposed and joined.

The above described front side sill inner 21, side sill joint 22, and side sill reinforcement 20 constitute the side sill 11. Namely, on the front side, the side sill 11 is formed by the front side sill inner 21 and the side sill reinforcement 20 in which the direction of separation of the member plates is the vehicle transverse direction, namely, the left-right direction. On the rear side thereof, the side sill 11 is formed by the front side sill inner 21, the side sill joint 22, and the side sill reinforcement 20 in which the direction of separation of the member plates is the left-right direction. Still further to the rear side thereof, the side sill 11 is formed by the side sill joint 22 and the side sill reinforcement 20 in which the direction of separation of the member plates is the left-right direction. Note that because the direction of separation of the member plates constituting the side sill 11 is the left-right direction, the side sill 11 has greater strength in the left-right direction than in the up-down direction. The side sill reinforcement 20 extends further towards the rear than the side sill joint 22.

Figure 9:
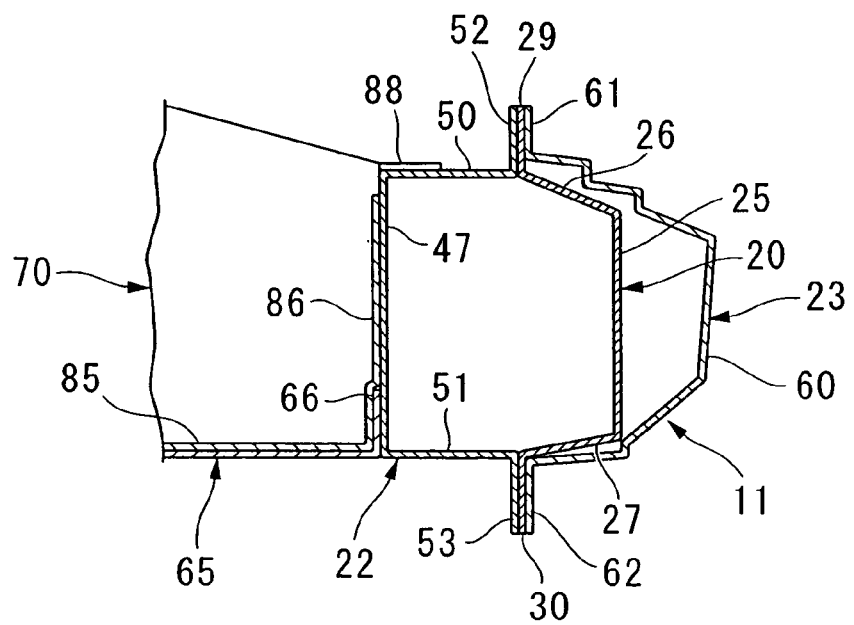
FIG. 9 is a front cross-sectional view from a position further to the rear side than in FIG. 8 of the vehicle body frame structure of an embodiment of the present invention.

Furthermore, as is shown in FIG. 4 and FIGS. 6 to 8, a front floor panel 65 has a flange portion 66 that is bent upward on an outer side in the vehicle transverse direction and is joined on the front side thereof to a bottom portion of the side plate portion 35 of the front side sill inner 21, while being joined on the rear side thereof to a bottom portion of the side plate portion 47 of the side sill joint 22, as is shown in FIG. 4 and FIG. 9.

A side end portion of the above described mid floor cross member 13 that runs in the vehicle transverse direction is joined to an inner side in the vehicle transverse direction of the side sill joint 22.

Figure 10:
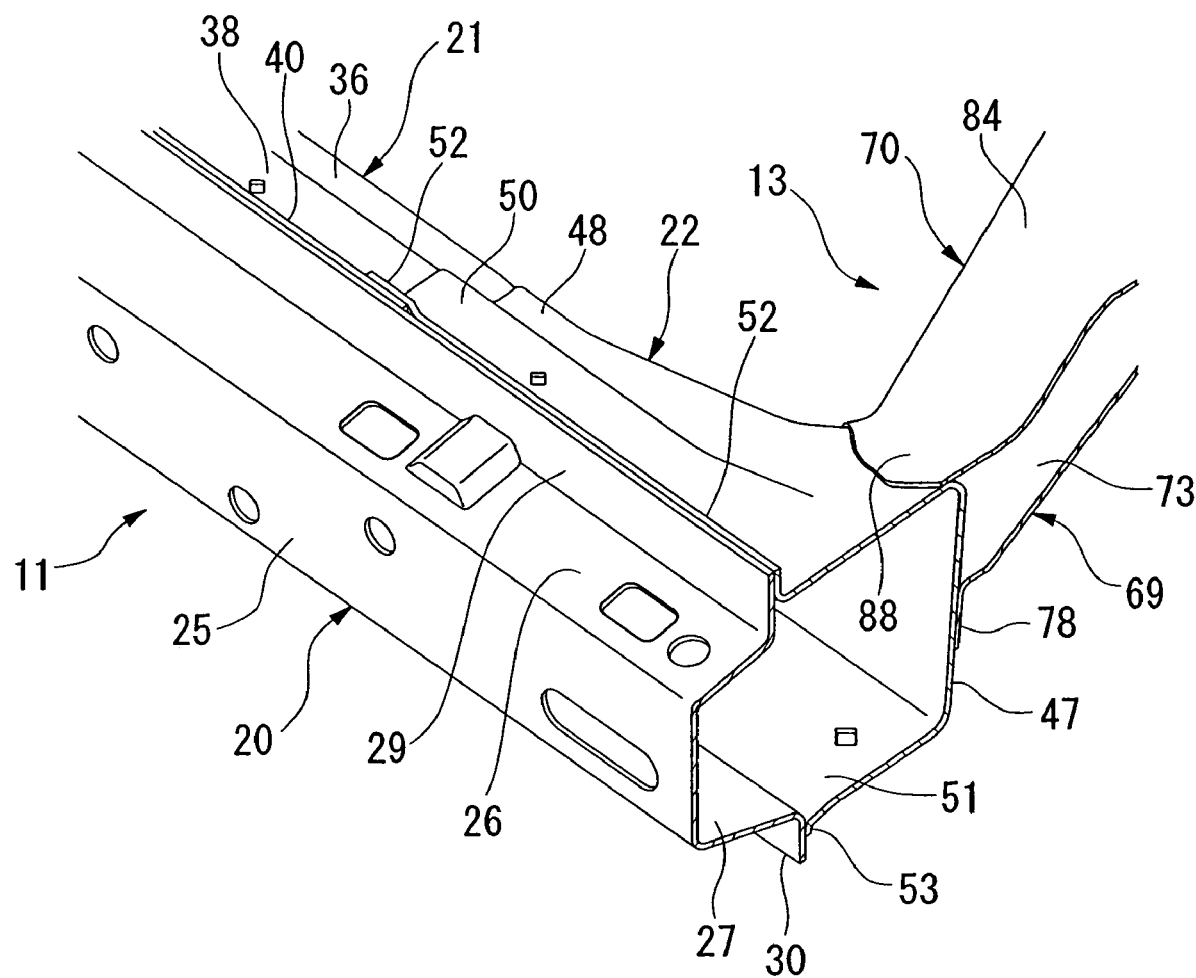
FIG. 10 is a perspective view showing a side sill and mid floor cross member of the vehicle body frame structure of an embodiment of the present invention cut in a cross-section at a right angle relative to the longitudinal direction of the vehicle body.

As is shown in FIG. 3, FIG. 4, and FIG. 10, the mid floor cross member 13 has a cross member body 69 that has a substantially L-shaped cross section and constitutes a bottom portion and rear portion of the mid floor cross member 13, and a mid floor panel 70 that has a substantially L-shaped cross section and constitutes the top portion and front portion of the mid floor cross member 13.

As is shown in FIG. 3, the cross member body 69 has a bottom plate portion 73 that extends in the vehicle transverse direction at a substantially horizontally aligned attitude, a back plate portion 74 that rises upward from a rear edge portion of the bottom plate portion 73, a flange portion 75 that is bent towards the rear from a top edge portion of the back plate portion 74, a flange portion 76 that is bent towards the rear from an edge portion on the outer side in the vehicle transverse direction of the back plate portion 74, a flange portion 77 that is bent downwards from a front edge portion of the bottom plate portion 73, and a flange portion 78 that is bent downwards from an edge portion on the outer side in the vehicle transverse direction of the bottom plate portion 73.

The mid floor panel 70 has a front plate portion 83 that extends in the vehicle transverse direction at a substantially vertically aligned attitude, a top plate portion 84 that is bent towards the rear from a top edge portion of the front plate portion 83, a flange portion 85 that is bent towards the front from a bottom edge portion of the front plate portion 83, a flange portion 86 that is bent towards the front from an edge portion on the outer side in the vehicle transverse direction of the front plate portion 83, a flange portion 87 (shown in FIG. 4) that protrudes towards the rear from a rear edge portion of the top plate portion 84, and a flange portion 88 that protrudes to the outer side in the vehicle transverse direction from an edge portion on the outer side in the vehicle transverse direction of the top plate portion 84.

When the cross member body 69 and the mid floor panel 70 are joined together, as is shown in FIG. 4, in the bottom portion, the flange portion 77 of the cross member body 69 is joined to a rear surface of the front plate portion 83 of the mid floor panel 70. In the top portion, the flange portion 75 of the cross member body 69 is joined to a bottom surface of the flange portion 87 of the mid floor panel 70. In this manner, the mid floor cross member 13, which has a closed cross-sectional structure, is formed by the cross member body 69 and the mid floor panel 70.

As is shown in FIG. 9, which is further to the rear than the position shown in FIG. 8, this mid floor cross member 13 enables the flange portion 86 of the mid floor panel 70 to be joined to a surface on the inner side in the vehicle transverse direction of the side plate portion 47 of the side sill joint 22, and to a surface on the inner side in the vehicle transverse direction of the flange portion 66 of the front floor panel 65. In addition, the mid floor cross member 13 enables the flange portion 85 to be joined to a top surface of a rear end portion of the front floor panel 65, and also, as is shown in FIG. 11, which is further to the rear than the position shown in FIG. 9, enables the flange portion 88 to be joined to a top surface of the top plate portion 50 of the side sill joint 22.

Figure 11:
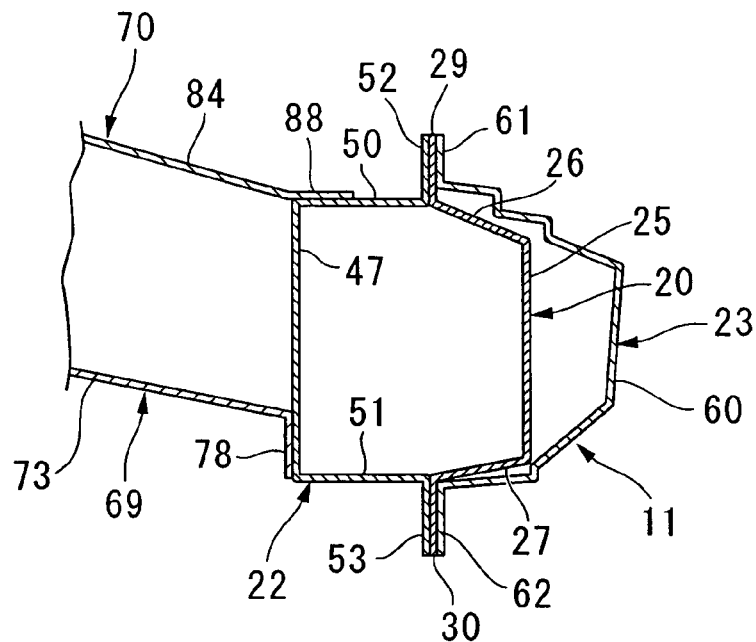
FIG. 11 is a front cross-sectional view from a position further to the rear side than in FIG. 9 of the vehicle body frame structure of an embodiment of the present invention.
Figure 12:
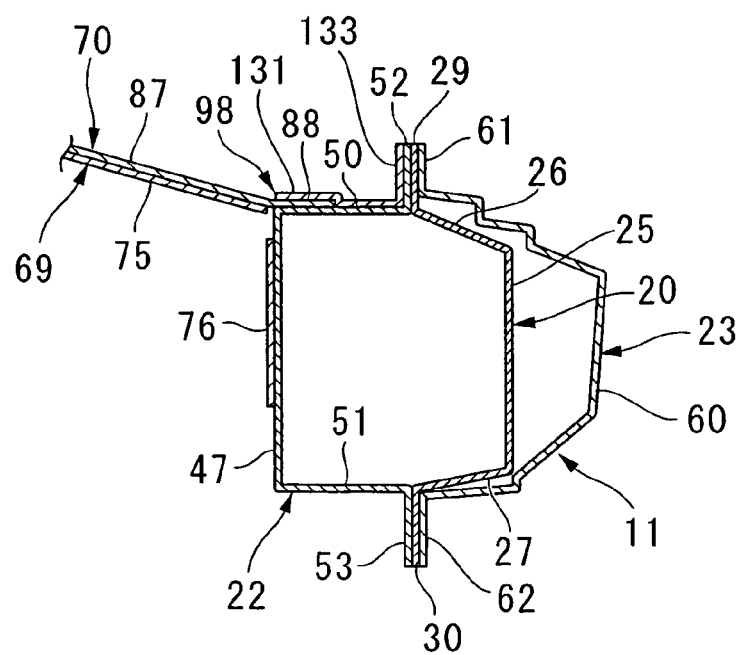
FIG. 12 is a front cross-sectional view from a position further to the rear side than in FIG. 11 of the vehicle body frame structure of an embodiment of the present invention.

In addition, as is shown in FIG. 11 and FIG. 12, which is further to the rear than FIG. 11, the mid floor cross member 13 enables the flange portions 76 and 78 of the cross member body 69 to be joined to a surface on the inner side in the vehicle transverse direction of the side plate portion 47 of the side sill joint 22.

Figure 13:
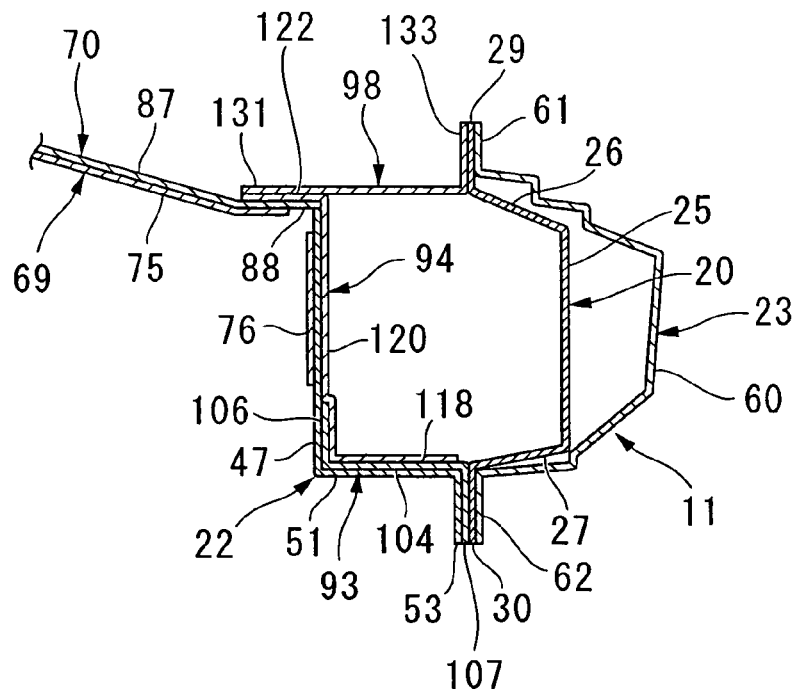
FIG. 13 is a front cross-sectional view from a position further to the rear side than in FIG. 12 of the vehicle body frame structure of an embodiment of the present invention.

As is shown in FIG. 3, a side sill rear extension 93 whose overall shape is aligned in both the vehicle transverse direction and longitudinal direction is joined, as is shown in FIG. 13, which is further to the rear than the position shown in FIG. 12, to a rear portion of the bottom plate portion 51 of the side sill joint 22. Above the side sill rear extension 93 there is provided a lower frame 94 whose front portion has a substantially L-shaped configuration and whose rear portion has a hat-shaped configuration that is open on the top side, as is shown in FIG. 3. The lower frame 94 protrudes to the rear beyond the side sill rear extension 93. Between a front portion of the lower frame 94 and the protruding portion of the rear portion of the side sill reinforcement 20 there is provided a rear frame side stiffener (i.e., a first stiffener) 95 whose overall shape is aligned in both the vehicle longitudinal direction and vertical direction. A side sill end flange 96 is provided between a rear portion of the rear frame side stiffener 95 and the outer side in the vehicle transverse direction of the lower frame 94.

The front portion of the lower frame 94 together with the rear frame side stiffener 95 form a hat-shaped cross section whose top side is open. An upper frame 98 is provided so as to close off the top side opening of the lower frame 94 and the rear frame side stiffener 95. A rear frame front stiffener (i.e., a second stiffener) 99 whose overall shape is aligned in both the vehicle transverse direction and longitudinal direction is provided in a portion that is surrounded by the lower frame 94, the rear frame side stiffener 95, and the upper frame 98. In addition, a rear frame stiffener (i.e., a second stiffener) 100 whose overall shape is aligned in both the vehicle transverse direction and longitudinal direction is also provided in this portion so as to elongate the rear frame front stiffener 99 towards the rear.

The side sill rear extension 93 has a front plate portion 104 that is aligned substantially horizontally, a rear plate portion 105 that protrudes from a rear end portion of the front plate portion 104 in a tapered configuration that slopes upwards towards the rear, a flange portion 106 that is bent upwards from an edge portion on the inner side in the vehicle transverse direction of the front plate portion 104 and rear plate portion 105, a flange portion 107 that is bent downwards from an edge portion on the outer side in the vehicle transverse direction of the front plate portion 104, and a flange portion 108 that is bent upwards from an edge portion on the outer side in the vehicle transverse direction of the rear plate portion 105. Note that, in the side sill rear extension 93, the front plate portion 104 forms the side sill 11, while the sloping rear plate portion 105 forms the rear frame 12.

The rear frame side stiffener 95 has a side plate portion 110 that extends substantially in a vertical direction and in a longitudinal direction and whose front portion has a bottom portion in which a notch is formed while the rear portion is configured so as to widen in an upward direction towards the rear, a top plate portion 111 that is bent outwards in the vehicle transverse direction from a top edge portion of the side plate portion 110, a flange portion 112 that is bent upwards from an edge portion on the outer side in the vehicle transverse direction of the top plate portion 111 except for in the front end portion thereof, a flange portion 113 that is bent inwards in the vehicle transverse direction from a bottom edge portion of that portion of the front portion of the side plate portion 110 that has a notch configuration, and a flange portion 114 that protrudes downwards from a bottom edge portion of a portion that is further to the rear than the portion of the side plate portion 110 that has a notch configuration. Here, although the front portion of the side plate portion 110 has a planar configuration, the rear portion thereof is slightly bent such that the bottom portion thereof slopes outwards in the vehicle transverse direction.

The lower frame 94 has a front plate portion 118 that is aligned substantially horizontally, a rear plate portion 119 that protrudes towards the rear from a rear end portion of the front plate portion 118 while sloping upwards towards the rear, an inner side plate portion 120 that is bent upwards from edge portions on the inner side in the vehicle transverse direction of the front plate portion 118 and rear plate portion 119, an outer side plate portion 121 that is bent upwards from an edge portion on the outer side in the vehicle transverse direction of the rear plate portion 119, and a flange portion 122 that is bent inwards in the vehicle transverse direction from a top edge portion of the inner side plate portion 120. Note that, in the lower frame 94 as well, the front plate portion 118 forms the side sill 11, while the sloping rear plate portion 119 forms the rear frame 12.

The side sill end flange 96 has a main plate portion 126 that is aligned substantially in a vertical direction and is also slanted so as to be positioned closer to the inner side in the vehicle transverse direction as it approaches the rear, a flange portion 127 that protrudes forwards from a front edge portion of the main plate portion 126, and a flange portion 128 that protrudes rearwards from a rear edge portion of the main plate portion 126.

The upper frame 98 has a front plate portion 131 that is aligned substantially horizontally, a rear plate portion 132 that extends rearwards while sloping upwards towards the rear from a rear edge portion of the front plate portion 131, and a flange portion 133 that is bent upwards from edge portions on the outer side in the vehicle transverse direction of the front plate portion 131 and rear plate portion 132, and is formed intermittently in the longitudinal direction. Note that, in the upper frame 98 as well, the front plate portion 131 forms the side sill 11, while the rear plate portion 132 forms the rear frame 12.

The rear frame front stiffener 99 has a front plate portion 137 that is aligned substantially horizontally, a rear plate portion 138 that protrudes while sloping upwards towards the rear from a rear edge portion of the front plate portion 137, and a flange portion 139 that is bent upwards from edge portions on the outer side in the vehicle transverse direction of the front plate portion 137 and rear plate portion 138, and a flange portion 140 that is bent upwards from edge portions on the inner side in the vehicle transverse direction of the front plate portion 137 and rear plate portion 138. Note that, in the rear frame front stiffener 99 as well, the front plate portion 137 forms the side sill 11, while the rear plate portion 138 forms the rear frame 12.

The rear frame stiffener 100 has a main plate portion 144 that extends rearwards while sloping upwards to the rear, a flange portion 145 that is bent upwards from an edge portion on the outer side in the vehicle transverse direction of the main plate portion 144, and a flange portion 146 that is bent upwards from an edge portion on the inner side in the vehicle transverse direction of the main plate portion 144.

As is shown in FIG. 13, although the side sill rear extension 93 is joined to a rear portion of the side sill joint 22, the flange portion 107 of the side sill rear extension 93 is joined between the flange portion 53 of the side sill joint 22 and the flange portion 30 of the side sill reinforcement 20. The front plate portion 104 of the side sill rear extension 93 is joined to a top surface of the bottom plate portion 51 of the side sill joint 22, and the flange portion 106 of the side sill rear extension 93 is joined to a surface on the outer side in the vehicle transverse direction of the side plate portion 47 of the side sill joint 22.

In addition, at the position shown in FIG. 13, the lower frame 94 is joined to a top side of the side sill rear extension 93, however, the front plate portion 118 of the lower frame 94 is joined to a top surface of the front plate portion 104 of the side sill rear extension 93, the inner side plate portion 120 of the lower frame 94 is joined respectively to surfaces on the outer side in the vehicle transverse direction of the flange portion 106 of the side sill rear extension 93 and of the side plate portion 47 of the side sill joint 22, and the flange portion 122 of the lower frame 94 is joined to a top surface of the flange portion 88 of the mid floor panel 70.

Furthermore, at the position shown in FIG. 13, the upper frame 98 is joined to the top side of the lower frame 94, however, the front plate portion 131 of the upper frame 98 is joined to a top surface of the flange portion 122 of the lower frame 94, and the flange portion 133 of the upper frame 98 is joined to a surface on the inner side in the vehicle transverse direction of the flange portion 29 of the side sill reinforcement 20. Note also that, as is shown in FIG. 12, the front plate portion 131 of the front end portion of the upper frame 98 is joined to a top surface of the top plate portion 50 of the side sill joint 22 and the flange portion 88 of the mid floor panel 70 at the position of the joint between these two. In addition, the flange portion 133 of the front end portion of the upper frame 98 is joined to a surface on the inner side in the vehicle transverse direction of the flange portion 52 of the side sill joint 22.

In addition, at the position shown in FIG. 13, the flange portion 76 of the cross member body 69 is joined to the inner side in the vehicle transverse direction of the side plate portion 47 of the side sore joint 22, while the flange portion 75 of the cross member body 69 is joined to the flange portion 87 the mid floor panel 70.

Here, at the position shown in FIG. 13, the side sill 11 is formed by joining together in the left-right direction the side sill reinforcement 20 having a hat-shaped cross section and a hat-shaped cross-sectional structure that is formed by the upper frame 98, the lower frame 94, the side sill joint 22, and the side sill rear extension 93.

Figure 14:
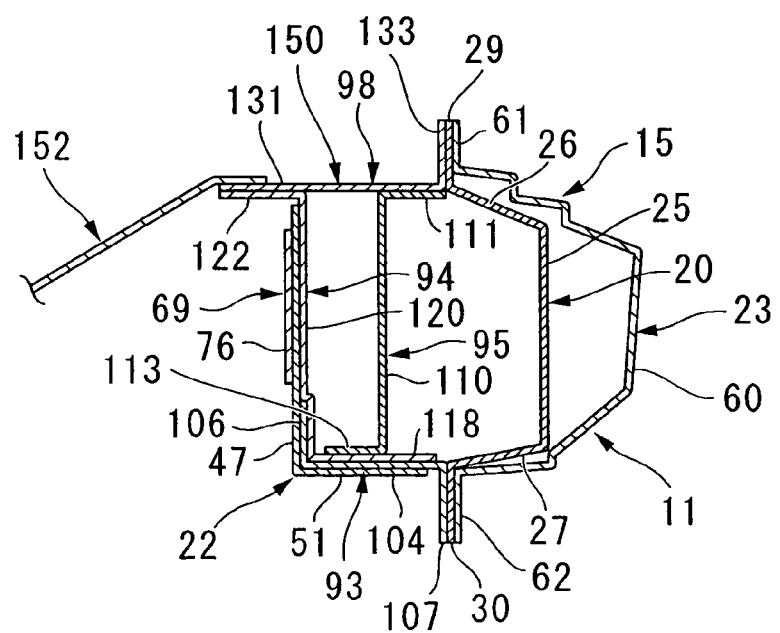
FIG. 14 is a front cross-sectional view from a position further to the rear side than in FIG. 13 of the vehicle body frame structure of an embodiment of the present invention.

At a position at a rear end portion of the side sill joint 22, which is on the rear side of the position shown in FIG. 13, as is shown in FIG. 14, the position of the front end portion of the rear frame side stiffener 95 is located between the lower frame 94 and the upper frame 98. At this time, with the side plate portion 110 of the rear frame side stiffener 95 having an attitude that is aligned in the vertical direction and also in the longitudinal direction, the flange portion 113 of the rear frame side stiffener 95 is joined to the top surface of the front plate portion 118 of the lower frame 94, while the top plate portion 111 thereof is joined to the bottom surface of the front plate portion 131 of the upper frame 98.

Here, the position shown in FIG. 14 is the position of the curved portion 15, which is in the vicinity of the boundary between the side sill 11 and the rear frame 12. As a result, the side sill reinforcement 20, which has a hat-shaped cross section in which the main direction of separation of the member plates is the left-right direction, and a hat-shaped cross-sectional structure, which is formed by the upper frame 98, the lower frame 94, the side sill joint 22, and the side sill rear extension 93, are joined together so as to form a side sill side closed cross-sectional structural portion 150 of the curved portion 15. The rear frame side stiffener 95 is placed between top and bottom surfaces of this side sill side closed cross-sectional structure portion 150, namely, between the front plate portion 131 of the upper frame 98 and the front plate portion 118 of the lower frame 94.

Note that, at the position shown in FIG. 14, in addition to the above, the flange portion 53 of the side sill joint 22 is not present, and neither is the flange portion 75 of the cross member body 69 present. Furthermore, a rear floor panel 152 is joined onto the front plate portion 131 of the upper frame 98. The remaining joints have substantially the same relationships as in the position shown in FIG. 13.

Figure 15:
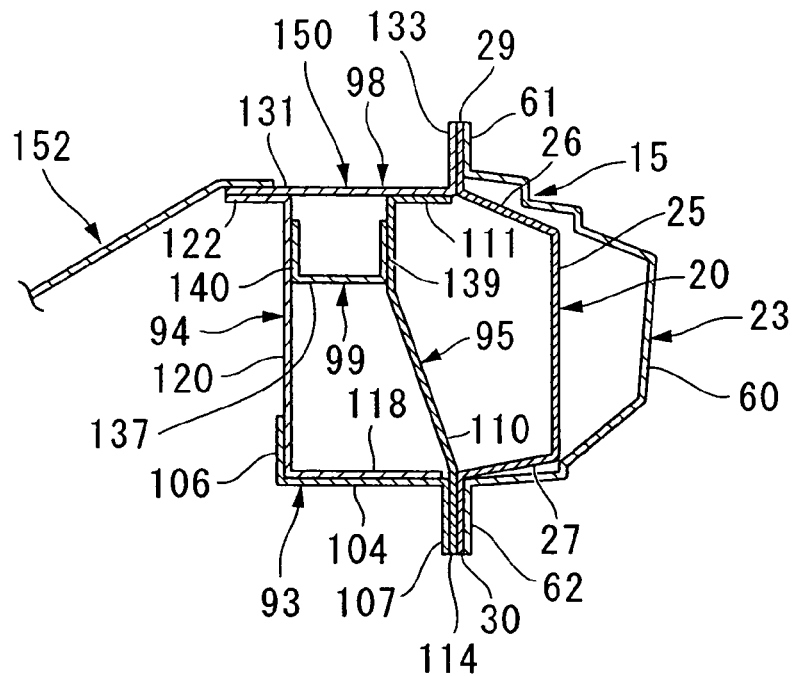
FIG. 15 is a front cross-sectional view from a position further to the rear side than in FIG. 14 of the vehicle body frame structure of an embodiment of the present invention.

On the rearward side of the position shown in FIG. 14, as is shown in FIG. 15, the flange portion 112 on the top side of the rear frame side fastener 95 is joined to the front plate portion 131 of the upper frame 98, while the flange portion 113 on the bottom side of the rear frame side fastener 95 is joined between the flange portion 107 of the side sill rear extension 93 and the flange portion 30 of the side sill reinforcement 20.

At the position shown in FIG. 15, the rear frame front stiffener 99 is provided between the lower frame 94 and the rear frame side stiffener 95. Namely, when the front plate portion 137 of the rear frame front stiffener 99 is placed in a substantially horizontal state, the flange portion 140 of the rear frame front stiffener 99 is joined to the surface on the outer side in the vehicle transverse direction of the inner side plate portion 120 of the lower frame 94, and the flange portion 139 thereof is joined to the surface on the inner side in the vehicle transverse direction of the rear frame side stiffener 95. Note that in order to join the rear frame front stiffener 99, which has a tapered front side, between the lower frame 94 and the rear frame side stiffener 95, the upper portion of the side plate portion 110 of the rear frame side stiffener 95 is made to slope downwards so as to approach the inner side plate portion 120 of the lower frame 94.

At the position shown in FIG. 15, in addition to the above, the side sill joint 22 and the cross member body 69 are no longer present, while the remainder of the joints have substantially the same relationships as at the position shown in FIG. 14. Here, the position shown in FIG. 15 also is the position of the curved portion 15, which is in the vicinity of the boundary between the side sill 11 and the rear frame 12, and is also the position of the side sill side closed cross-sectional structure portion 150.

Figure 16:
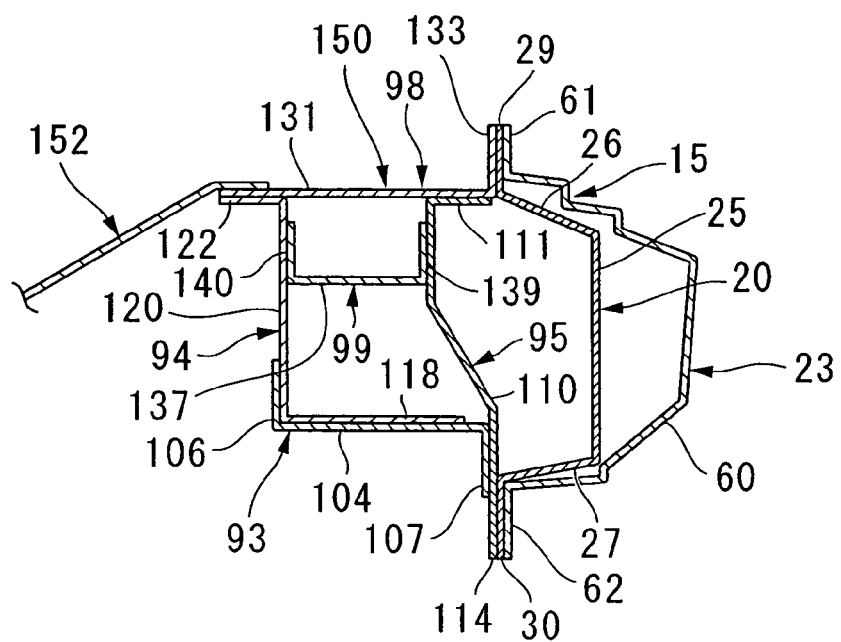
FIG. 16 is a front cross-sectional view from a position further to the rear side than in FIG. 15 of the vehicle body frame structure of an embodiment of the present invention.

On the rear side of the position shown in FIG. 15, as is shown in FIG. 16, the width in the vehicle transverse direction of the front plate portion 137 of the rear frame front fastener 99 becomes wider, and the flange portion 107 of the side sill rear extension 93 is joined to the rear frame side stiffener 95 at a position above the position where the flange portion 30 of the side sill reinforcement 20 is joined to the rear frame side stiffener 95.

Note that, in the position shown in FIG. 16, apart from the structure described above, the remainder of the joints have substantially the same relationships as at the position shown in FIG. 15. Here, the position shown in FIG. 16 also is the position of the curved portion 15, which is in the vicinity of the boundary between the side sill 11 and the rear frame 12, and is also the position of the side sill side closed cross-sectional structure portion 150.

In the above described side sill side closed cross-sectional structure portion 150, the main direction of separation of the member plates is the left-right direction, and the side sill side closed cross-sectional structure portion 150 has greater strength in the left-right direction than in the up-down direction. Consequently, the rear frame side stiffener 95 is provided in order to link together the top and bottom surfaces of the side sill side closed cross-sectional structure portion 150 in the up-down direction, so as to reinforce the weak direction strength-wise of the side sill side closed cross-sectional structure portion 150. In addition, the above described rear frame front stiffener 99 is provided at the rear portion of the side sill side closed cross-sectional structure portion 150 so as to link together the rear frame side stiffener 95 and the inner side plate portion 120 of the lower frame 94 in the left-right direction.

Figure 17:
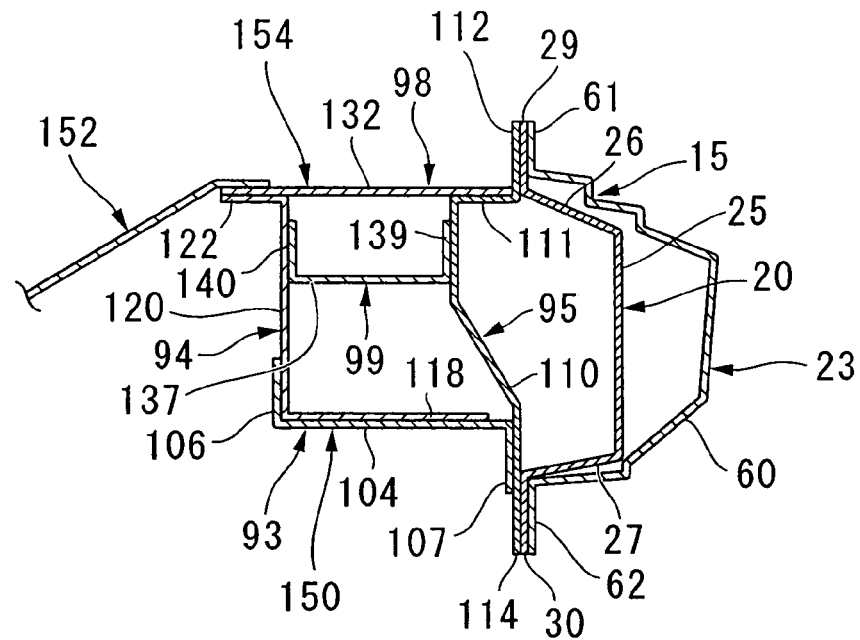
FIG. 17 is a front cross-sectional view from a position further to the rear side than in FIG. 16 of the vehicle body frame structure of an embodiment of the present invention.

On the rear side of the position shown in FIG. 16, as is shown in FIG. 17, the upper frame 98 becomes the rear plate portion 132 that is not provided with a flange portion, and the top plate portion 111 of the rear frame side stiffener 95 is joined to the bottom surface of the rear plate portion 132. In addition, the flange portion 112 that is above the top plate portion 111 in the rear frame side stiffener 95 is joined to the inner side in the vehicle transverse direction of the flange portion 29 of the side sill reinforcement 20.

Note that, in the position shown in FIG. 17, apart from the structure described above, the remainder of the joints have substantially the same relationships as at the position shown in FIG. 16. Here, the position shown in FIG. 17 is the position of the curved portion 15, which is in the vicinity of the boundary between the side sill 11 and the rear frame 12, and is also the position of the boundary between the side sill side closed cross-sectional structure portion 150 and a rear frame side closed cross-sectional structure portion 154.

Here, the portion of the curved portion 15 that is on the front side of the boundary portion between the front plate portion 118 and the rear plate portion 119 of the lower frame 94 and is also on the front side of the boundary portion between the front plate portion 131 and the rear plate portion 132 of the upper frame 98 forms the side sill side closed cross-sectional structure portion 150, which constitutes a portion of the side sill 11. The rear frame side stiffener 95 and the rear frame front stiffener 99 are placed on this side sill side closed cross-sectional structure portion 150.

Moreover, the portion of the curved portion 15 that is on the rear side of the boundary portion between the front plate portion 118 and the rear plate portion 119 of the lower frame 94 and is also on the rear side of the boundary portion between the front plate portion 131 and the rear plate portion 132 of the upper frame 98 forms the rear frame side closed cross-sectional structure portion 154, which constitutes a portion of the rear frame 12.

Figure 18:
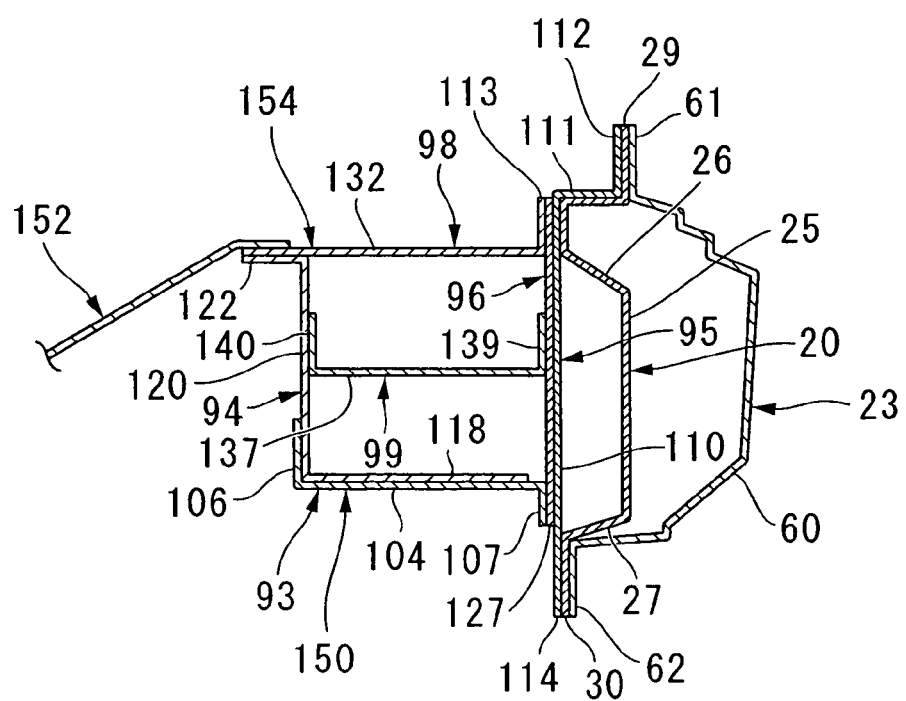
FIG. 18 is a front cross-sectional view from a position further to the rear side than in FIG. 17 of the vehicle body frame structure of an embodiment of the present invention.

On the rear side of the position shown in FIG. 17, as is shown in FIG. 18, the flange portion 127 of the side sill end flange 96 is joined between the side plate portion 110 of the rear frame side stiffener 95 and the flange portion 133 of the upper frame 98 and flange portion 107 of the side sill rear extension 93. Namely, the flange portion 127 of the side shell end flange 96 is joined over the entire length thereof in the vertical direction to the inner side in the vehicle transverse direction of the side plate portion 110 of the rear frame side stiffener 95. In addition, the flange portion 133 of the upper frame 98 is joined to the inner side in the vehicle transverse direction of the top end portion of the flange portion 127 of the side sill end flange 96. Moreover, the flange portion 107 of the side sill rear extension 93 is joined to the inner side in the vehicle transverse direction of the bottom end portion of the flange portion 127 of the side sill end flange 96. At this time, the top end portion of the side plate portion 110 of the rear frame side stiffener 95 and the top plate portion 111 are joined to the top portion of the side sill reinforcement 20.

Figure 19:
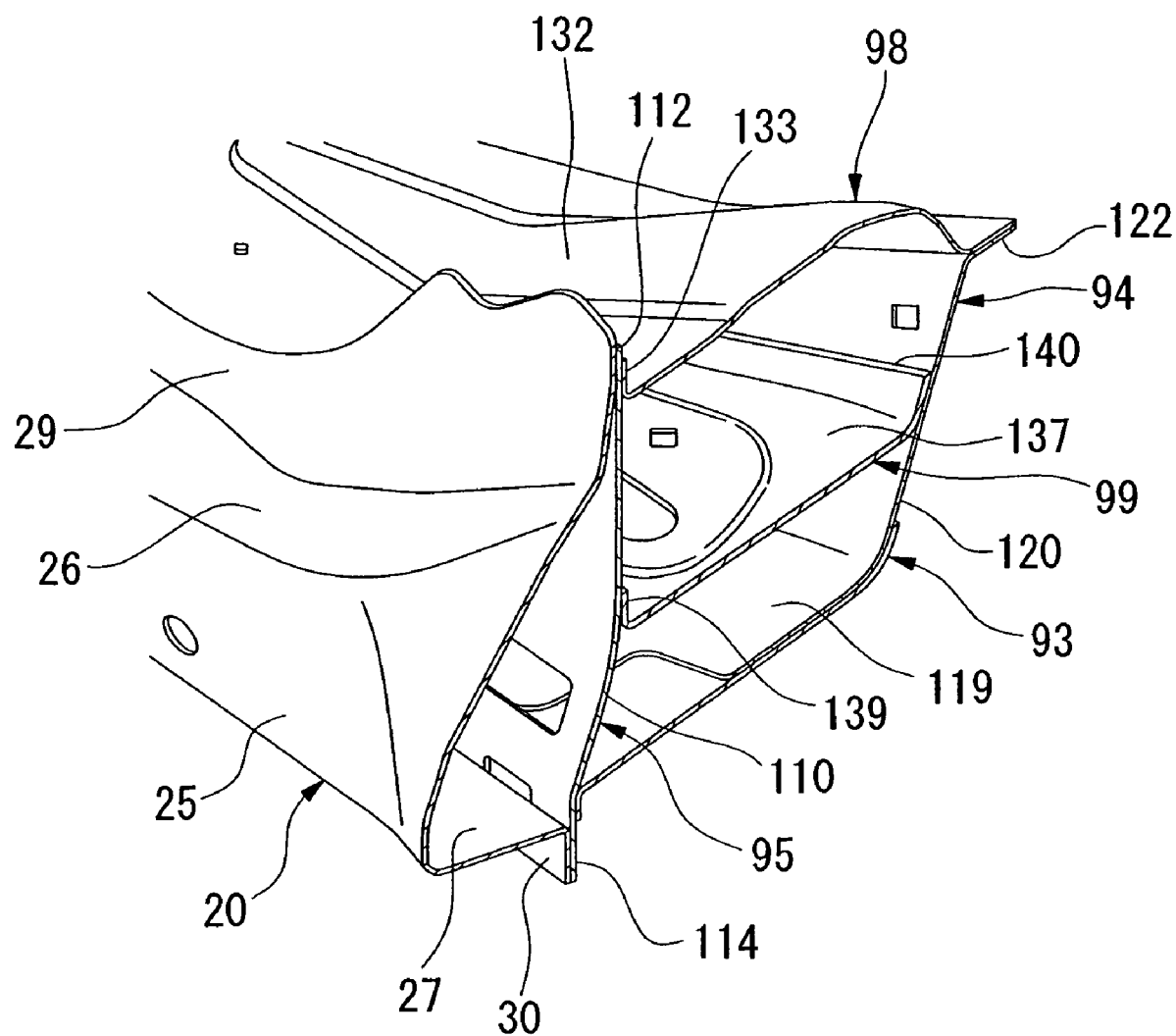
FIG. 19 is a perspective view showing a front portion of a curved portion of the vehicle body frame structure of an embodiment of the present invention cut in a cross-section at a right angle relative to the longitudinal direction of the vehicle body.

Note that, as is also shown in FIG. 19, when the front plate portion 137 is aligned in the vehicle transverse direction, the flange portion 140 of the rear frame front stiffener 99, which is on the inner side in the vehicle transverse direction, is joined to the inner side plate portion 120 of the lower frame 94, and the flange portion 139 on the outer side in the vehicle transverse direction is joined to the side plate portion 110 of the rear frame side stiffener 95.

Note that, in the position shown in FIG. 18, apart from the structure described above, the remainder of the joints have substantially the same relationships as at the position shown in FIG. 17. Here, the position shown in FIG. 18 also is the position of the curved portion 15, which is in the vicinity of the boundary between the side sill 11 and the rear frame 12, and is also the position of the boundary between the side sill side closed cross-sectional structure portion 150 and the rear frame side closed cross-sectional structure portion 154.

Figure 20:
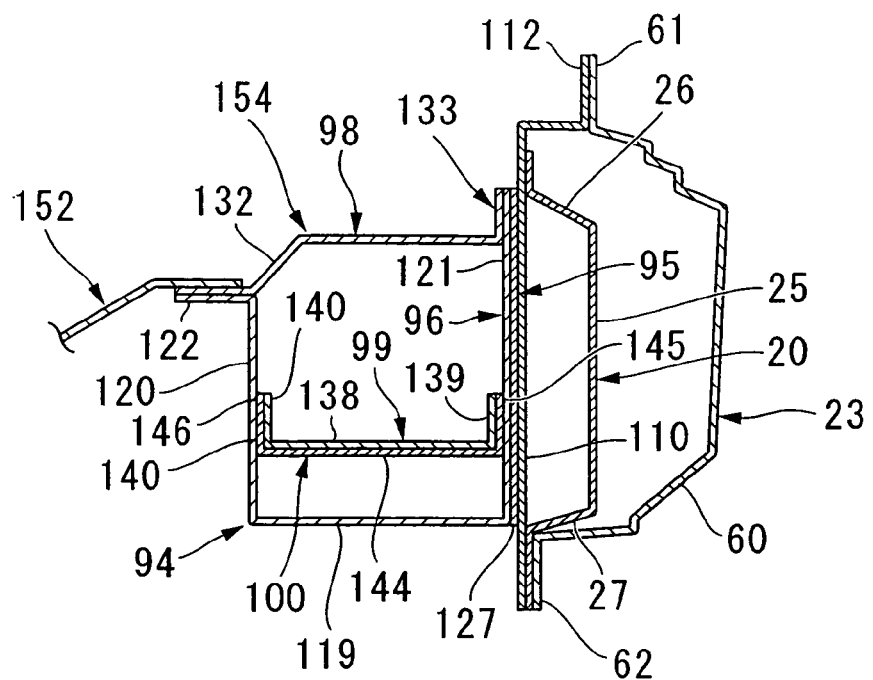
FIG. 20 is a front cross-sectional view from a position further to the rear side than in FIG. 18 of the vehicle body frame structure of an embodiment of the present invention.

On the rear side of the position shown in FIG. 18, as is shown in FIG. 20, the side sill rear extension 93 is no longer present. Moreover, the lower frame 94 changes to a hat-shaped cross section that is open at the top, and is joined via the outer side plate portion 121 thereof, which is on the outer side in the vehicle transverse direction, to the inner side in the vehicle transverse direction of the flange portion 127 on the front side of the side sill end flange 96. Furthermore, the main plate portion 144 of the front end portion of the rear frame stiffener 100 is joined to the bottom side of the rear plate portion 138 of the rear end portion of the rear frame front stiffener 99. In addition, the flange portion 145 of the rear frame stiffener 100 that is joined to the outer side in the vehicle transverse direction of the flange portion 139 on the outer side in the vehicle transverse direction of the rear frame front stiffener 99 is joined to the outer side plate portion 121 of the lower frame 94. Moreover, the flange portion 146 of the rear frame stiffener 100 that is joined to the inner side in the vehicle transverse direction of the flange portion 140 on the inner side in the vehicle transverse direction of the rear frame front stiffener 99 is joined to the inner side plate portion 120 of the lower frame 94.

At the position shown in FIG. 20, the top portion of the side sill reinforcement 20 moves away from between the flange portion 112 of the rear frame side stiffener 95 and the flange portion 61 of the outer panel 23.

Note that, in the position shown in FIG. 20, apart from the structure described above, the remainder of the joints have substantially the same relationships as at the position shown in FIG. 18. Here, as is described above, the position shown in FIG. 20 is the position where the rear frame front stiffener 99 becomes the rear plate portion 138 and where the lower frame 94 becomes the rear plate portion 119, and is the position of the curved portion 15, which is in the vicinity of the boundary between the side sill 11 and the rear frame 12, and is also the position of the rear frame side closed cross-sectional structure portion 154.

Figure 21:
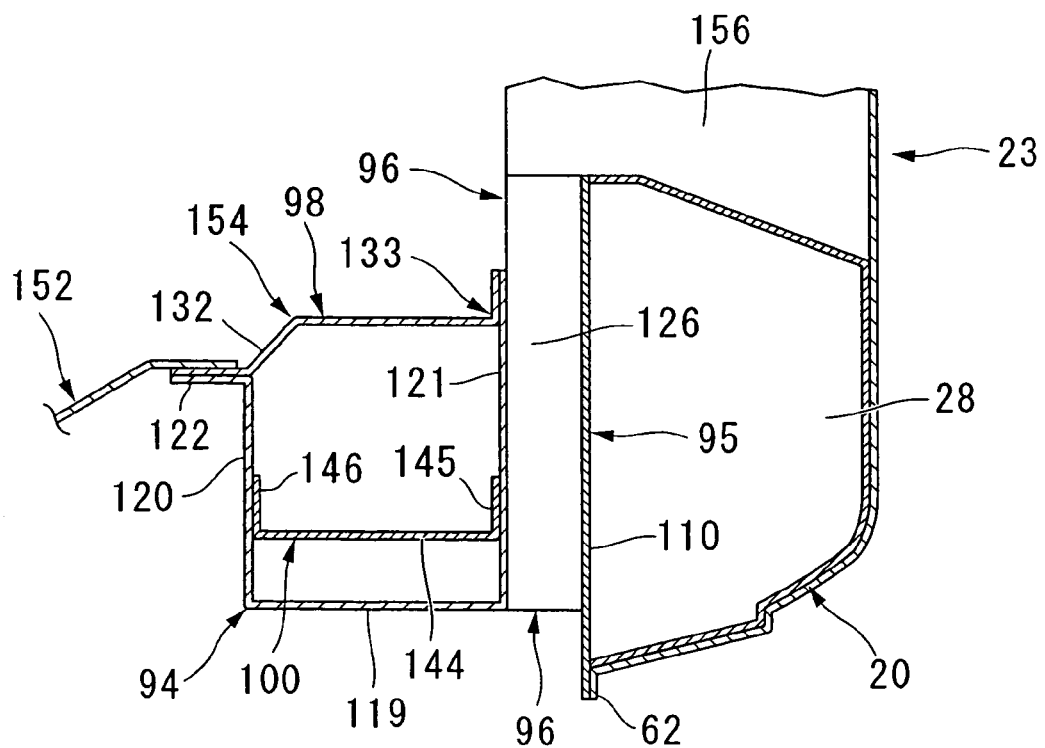
FIG. 21 is a front cross-sectional view from a position further to the rear side than in FIG. 20 of the vehicle body frame structure of an embodiment of the present invention.
Figure 22:
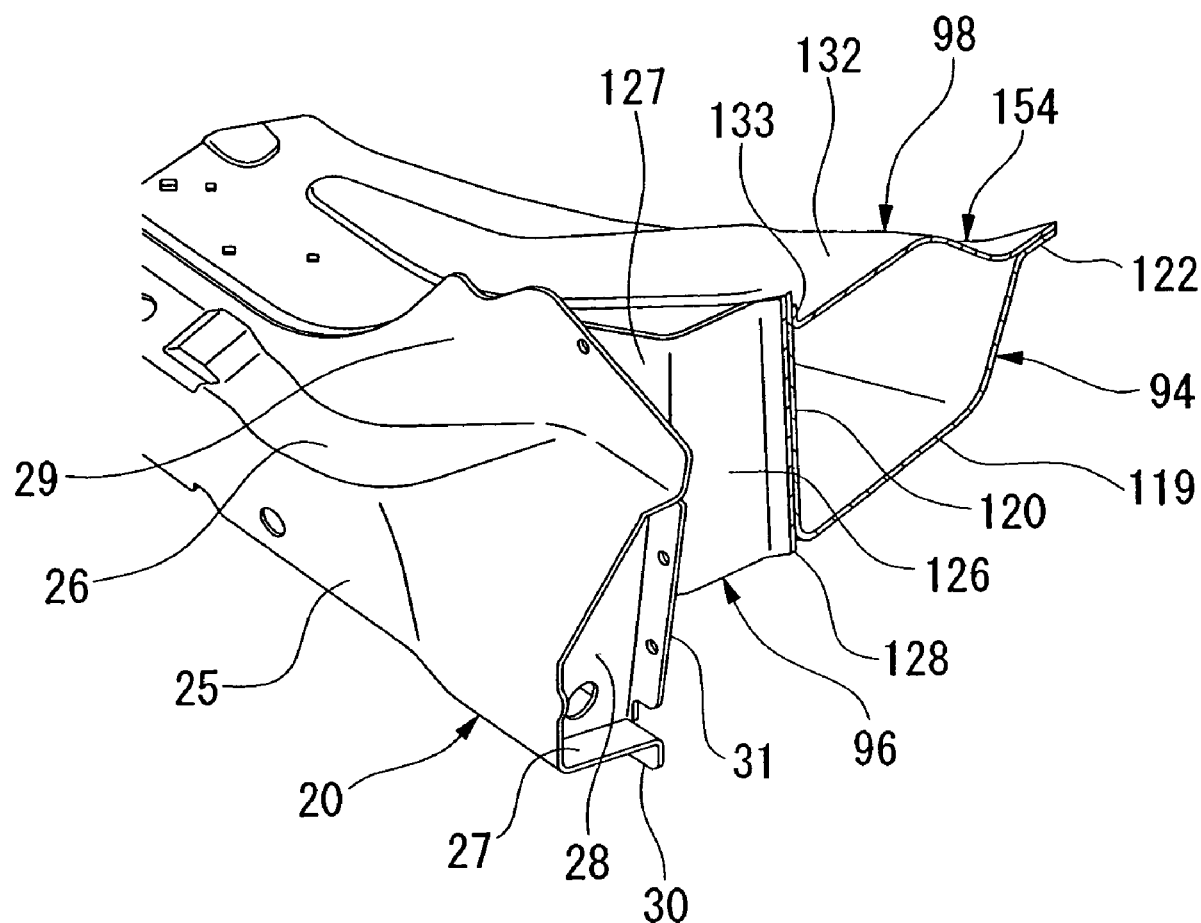
FIG. 22 is a perspective view showing a rear portion of a curved portion of the vehicle body frame structure of an embodiment of the present invention cut in a cross-section at a right angle relative to the longitudinal direction of the vehicle body.

On the rear side of the position shown in FIG. 20, as is shown in FIG. 21 and FIG. 22, the flange portion 133 of the upper frame 98 is joined to the inner side in the vehicle transverse direction of the outer side plate portion 121 that is on the outer side in the vehicle transverse direction of the lower frame 94, which has a hat-shaped cross section that is open at the top. In a state in which the rear frame front stiffener is not present, the flange portion 146 on the inner side in the vehicle transverse direction of the rear frame stiffener 100 is joined to the inner side plate portion 120 of the lower frame 94, and the flange portion 145 on the outer side in the vehicle transverse direction of the rear frame stiffener 100 is joined to the outer side plate portion 121 of the lower frame 94.

On the rear side of the position shown in FIG. 21, the rear frame side stiffener 95 that is joined to the rear side flange portion 128 by the main plate portion 126 of the side sill end flange 96 moves away from the lower frame 94 towards the outer side in the vehicle transverse direction, and a rear wheel arch 156 is joined to the top side of the side sill end flange 96, the rear frame side stiffener 95 and the side sill reinforcement 20.

Note that, in the position shown in FIG. 21, apart from the structure described above, the remainder of the joints have substantially the same relationship as at the position shown in FIG. 20. Here, the position shown in FIG. 21 also is the position of the curved portion 15, which is in the vicinity of the boundary between the side sill 11 and the rear frame 12, and is also the position of the rear frame side closed cross-sectional structure portion 154.

Here, in the rear frame side closed cross-sectional structure portion 154 at the position shown in FIG. 21, the lower frame 94, which has a hat-shaped cross section, and the upper frame 98 are joined together so as to block off the aperture side of the lower frame 94 such that the main direction of separation of the member plates becomes the up-down direction. As a result, the strength of the rear frame side closed cross-sectional structure portion 154 is greater in the up-down direction than in the left-right direction. Moreover, the rear frame stiffener 100 is provided between the left and right surfaces of the rear frame side closed cross-sectional structure portion 154, namely, between the inner side plate portion 120 and the outer side plate portion 121 of the lower frame 94 so as to reinforce the left-right direction which is weak strength-wise.

Figure 23:
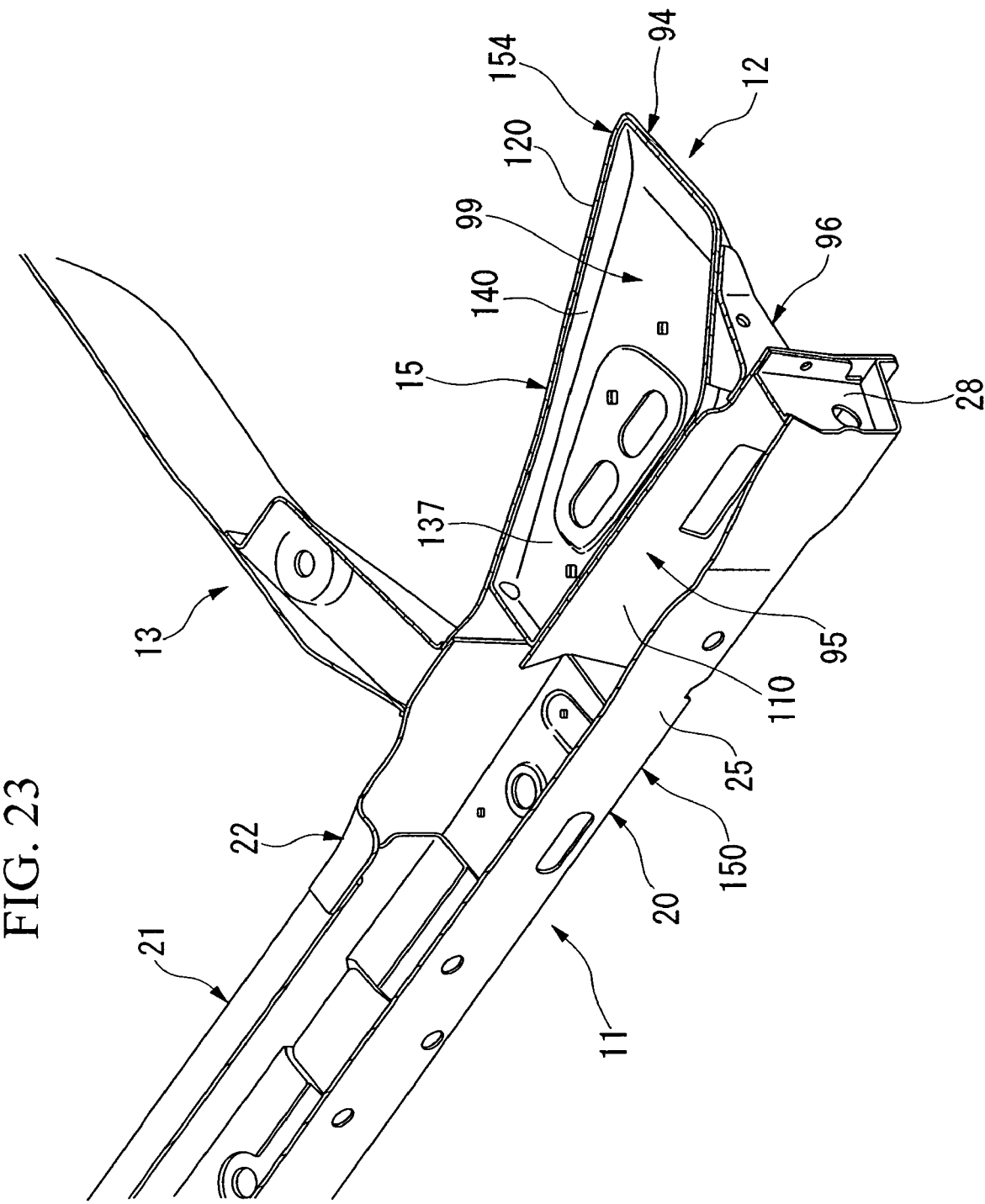
FIG. 23 is a perspective view showing a curved portion of the vehicle body frame structure of an embodiment of the present invention cut in a horizontal cross-section.
Figure 24:
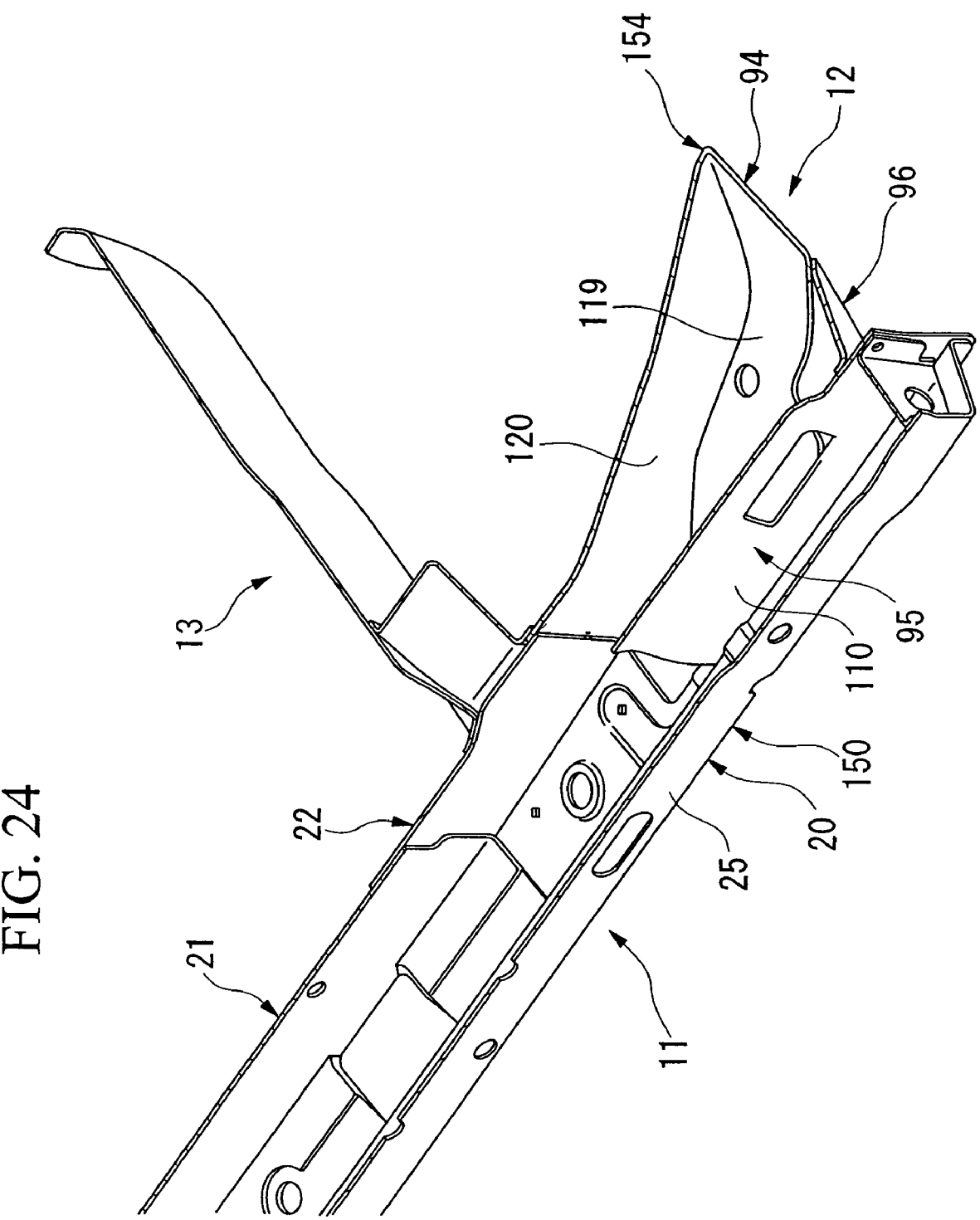
FIG. 24 is a perspective view showing a curved portion of the vehicle body frame structure of an embodiment of the present invention at a position below that of FIG. 23 cut in a horizontal cross-section.

As a result of the above, the side sill 11, which has a closed cross-sectional structure, and the rear frame 12, which also has a closed cross-sectional structure, are joined together such that the closed cross-sectional structures are made continuous with each other. In addition, in the curved portion 15 in the vicinity of the boundary between the side sill 11 and the rear frame 12, as is shown in FIGS. 23 and 24, the rear frame side stiffener 95 is provided extending from the side sill 11 side to the rear frame 12 side and aligned in the vertical direction between the top and bottom surfaces of the side sill side closed cross-sectional structure portion 150. Moreover, the rear frame front stiffener 99 and the rear frame stiffener 100 are provided aligned in the left-right direction between the left and right surfaces of the rear frame side closed cross-sectional structure portion 154, and the rear frame side stiffener 95 on the side sill 11 side and the rear frame front stiffener 99 on the rear frame 12 side partially overlap each other in the direction of the connection between the side sill 11 and the rear frame 12.

Namely, in the curved portion 15, extending from the side sill 11 side to the rear frame 12 side, a continuous change is achieved from the side sill side closed cross-sectional structure portion 150 where the rear frame side stiffener 95 is provided to the rear frame side closed cross-sectional structure portion 154 where the. rear frame front stiffener 99 and the rear frame stiffener 100 are provided in a different alignment direction from that of the rear frame side stiffener 95.

Figure 25:
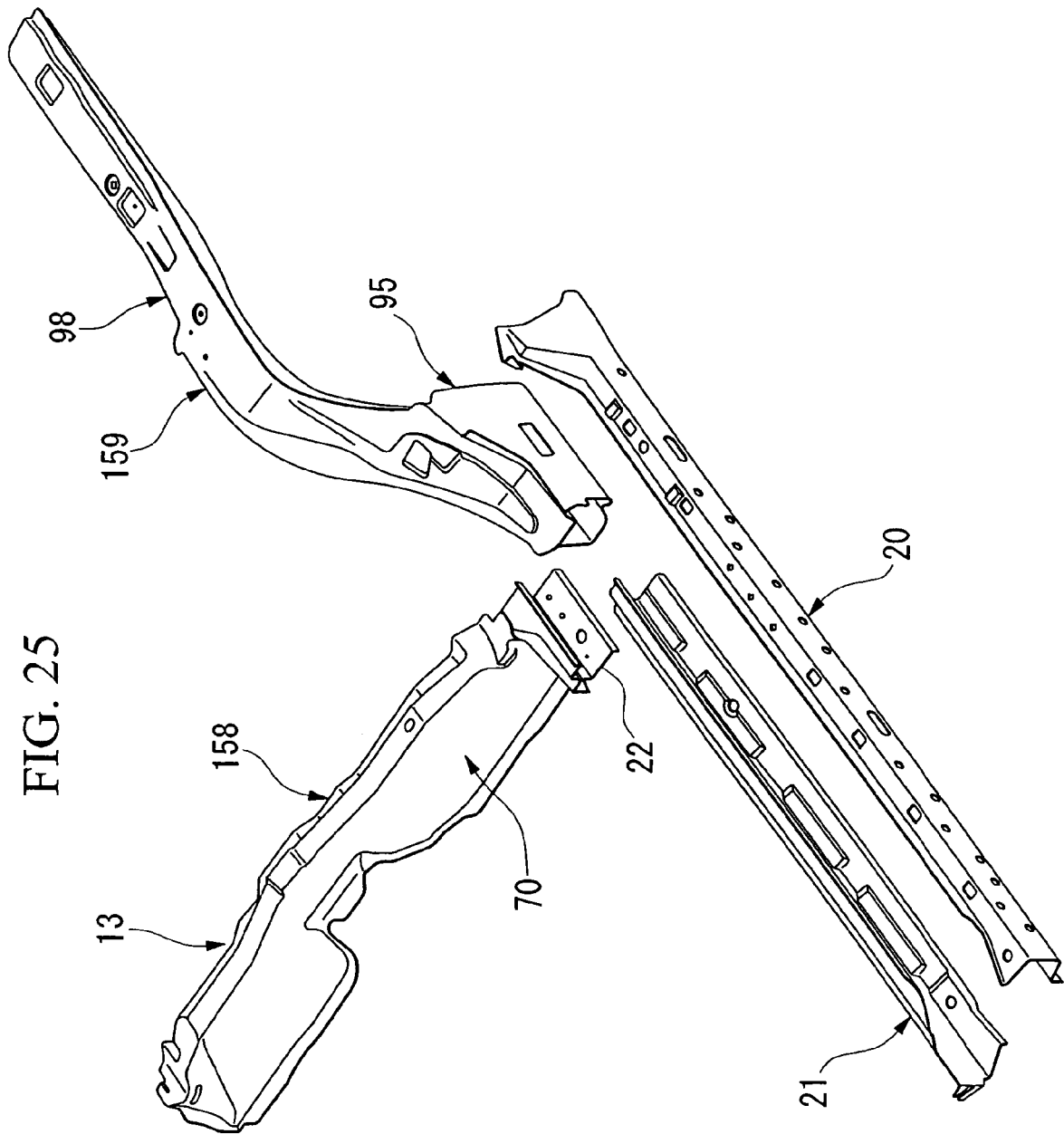
FIG. 25 is a perspective view showing a procedure when the vehicle body frame structure of an embodiment of the present invention is joined together.
Figure 26:
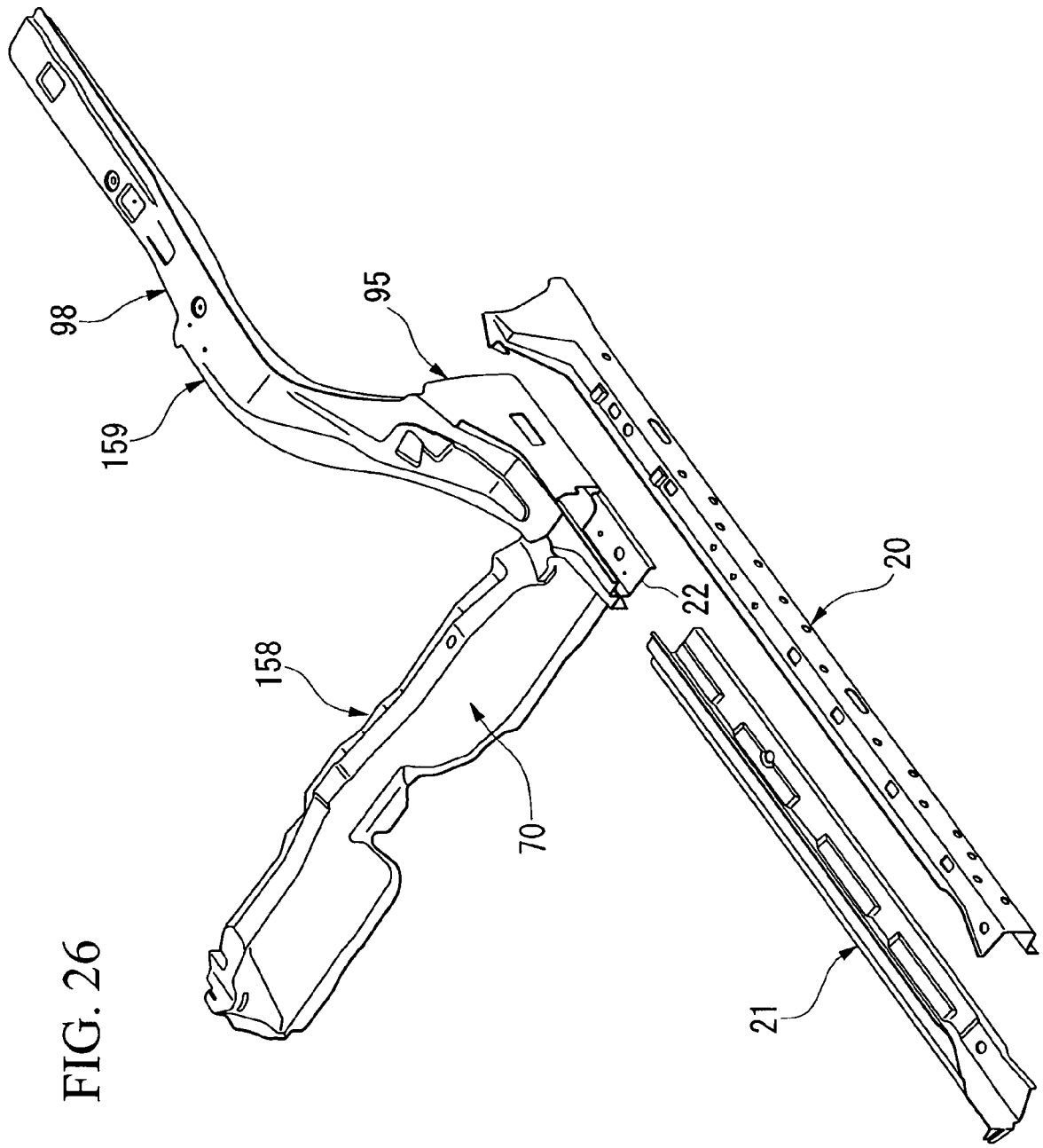
FIG. 26 is a perspective view showing a procedure at a subsequent stage to that in FIG. 25 when the vehicle body frame structure of an embodiment of the present invention is joined together.
Figure 27:
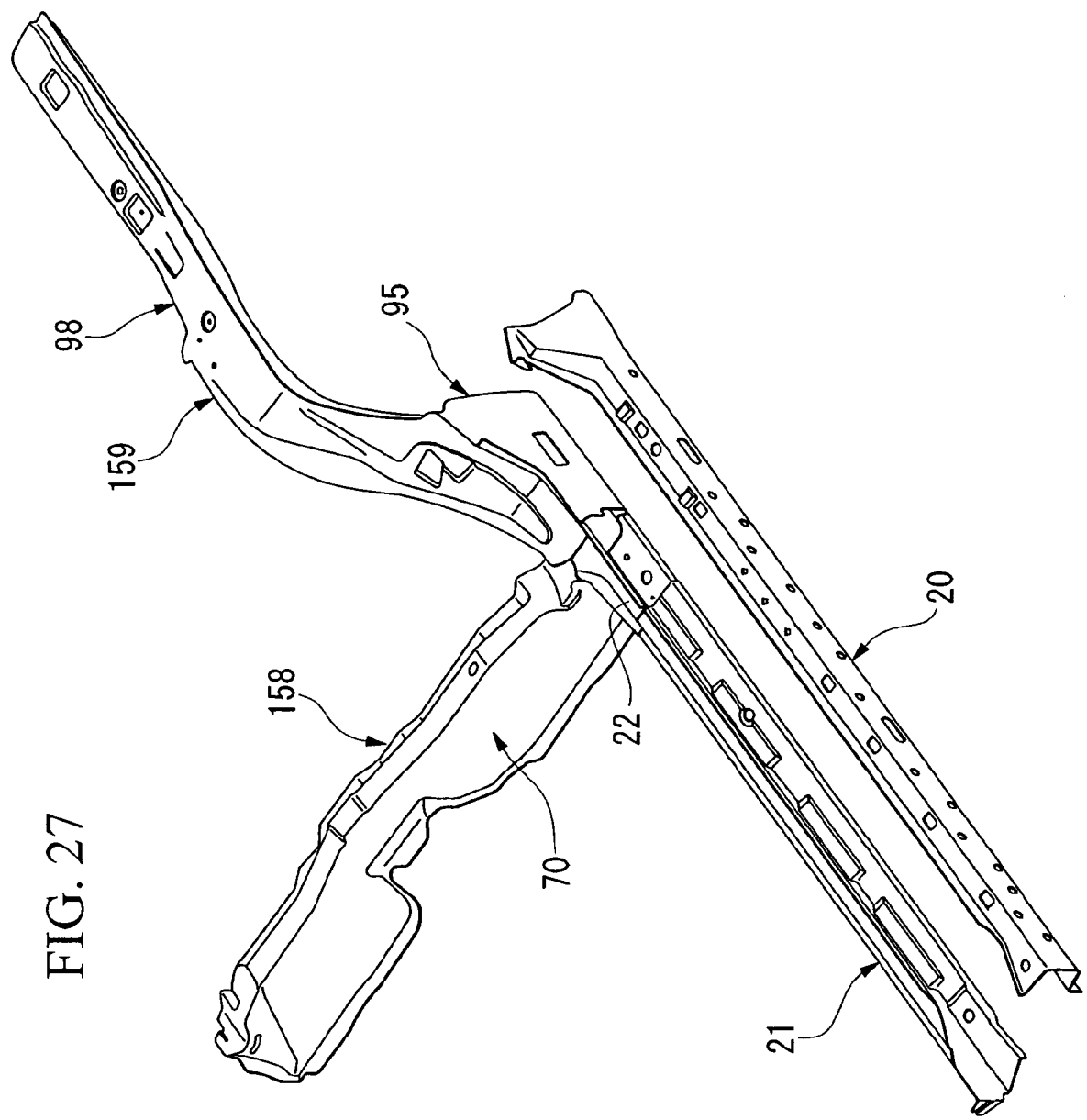
FIG. 27 is a perspective view showing a procedure at a subsequent stage to that in FIG. 26 when the vehicle body frame structure of an embodiment of the present invention is joined together.
Figure 28:
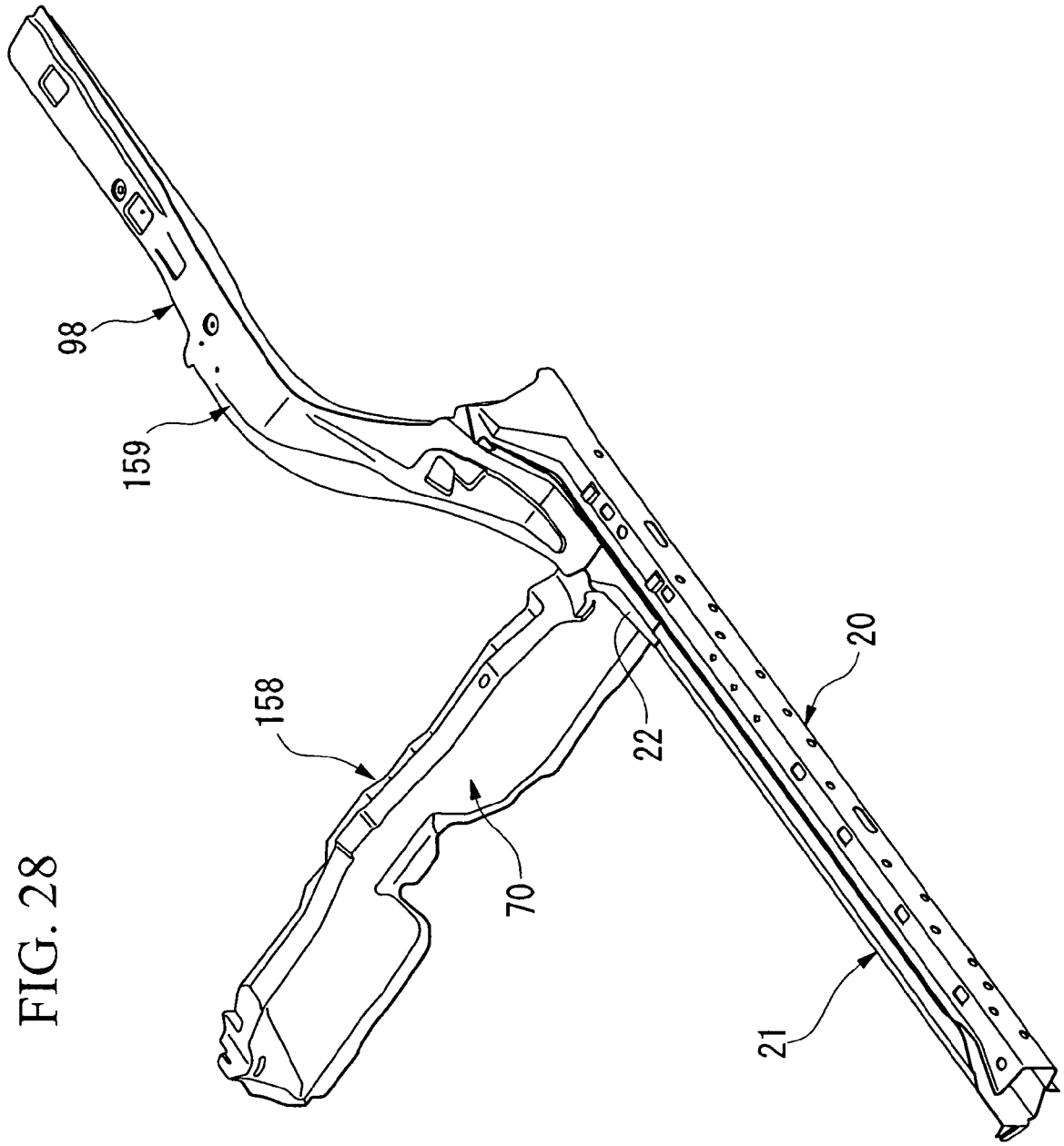
FIG. 28 is a perspective view showing a procedure at a subsequent stage to that in FIG. 27 when the vehicle body frame structure of an embodiment of the present invention is joined together.

Note that, in the above described structure, the side sill joint 22 is joined in advance to the mid floor cross member 13 in which the cross member body 69 and the mid floor panel 70 are joined together, thereby forming the cross member subgroup portion 158 shown in FIG. 25. Furthermore, the side sill rear extension 93, the lower arm 94, the rear frame side stiffener 95, the side sill end flange 96, the upper frame 98, the rear frame front stiffener 99, and the rear frame stiffener 100 are joined together in advance, thereby forming the rear frame subgroup portion 159 shown in FIG. 25. In addition, after the cross member subgroup portion 158 and the rear frame subgroup portion 159 have been joined together as is shown in FIG. 26, the front side sill inner 21 is joined to the side sill joint 22 as is shown in FIG. 27, and the side sill reinforcement 20 is further joined to the outer side in the vehicle transverse direction of the structure hitherto obtained as is shown in FIG. 28.

According to the vehicle body frame structure of the above described present embodiment, because the curved portion 15, which is in the vicinity of the boundary between the side sill 11 and the rear frame 12 that are continuously joined, continuously changes extending from the side sill 11 side to the rear frame 12 side from the side sill side closed cross-sectional structure portion 150 where the rear frame side stiffener 95 is provided to the rear frame side closed cross-sectional structure portion 154 where the rear frame front stiffener 99 and the rear frame stiffener 100 are provided in a different alignment direction from that of the rear frame side stiffener 95, the strength of the curved portion 15 is improved.

Moreover, because the alignment direction of the rear frame side stiffener 95 is different from that of the rear frame front stiffener 99 and rear frame stiffener 100, the respective directions of reinforcement can each be optimized on the side sill 11 side and the rear frame 12 side. Namely, the rear frame side stiffener 95 is placed between the top and bottom surfaces of the side sill side closed cross-sectional structure portion 150, which has less strength against force in the up-down direction than in the left-right direction, while the rear frame front stiffener 99 and the rear frame stiffener 100 are placed between left and right surfaces of the rear frame closed cross-sectional structure portion 154 that has less strength against force 2. The vehicle body frame structure according to claim 1, wherein the strength of the side sill is greater in a left-right direction than in an up-down direction, and the strength of the rear frame is greater in an up-down direction than in a left-right direction, and wherein said first stiffener is arranged between a top surface and a bottom surface of the side sill side closed cross-sectional structure portion, and said second stiffener is arranged between a left surface and a right surface of the rear frame side closed cross-sectional structure portion. in the left-right direction than in the up-down direction. As a result, the respective directions of reinforcement can each be optimized on the side sill 11 side and the rear frame 12 side.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A vehicle body frame structure comprising a side sill and a rear frame joined together so as to be continuous with each other, with a curved portion formed in the vicinity of a boundary between the side sill and the rear frame; and a side sill side closed cross-sectional structure portion with a first stiffener arranged therein, and a rear frame side closed cross-sectional structure portion with a second stiffener arranged therein that has a different direction of alignment from that of the first stiffener, said side sill side closed cross-sectional structure portion and said rear frame side closed cross-sectional structure portion being provided in said curved portion such that a continuous change is achieved extending from the side sill side to the rear frame side from said side sill side closed cross-sectional structure portion to said rear frame side close cross-sectional structure portion.

2. The vehicle body frame structure according to claim 1, wherein the strength of the side sill is greater in a left-right direction than in an up-down direction, and the strength of the rear frame is greater in an up-down direction than in a left-right direction, and wherein said first stiffener is arranged between a top surface and a bottom surface of the side sill side closed cross-sectional structure portion, and said second stiffener is arranged between a left surface and a right surface of the rear frame side closed cross-sectional structure portion.

\* \* \* \* \*